United States Patent
Ozawa et al.

(10) Patent No.: US 7,913,904 B2
(45) Date of Patent: Mar. 29, 2011

(54) MEDIUM EVALUATION METHOD

(75) Inventors: Kazushi Ozawa, Tokyo (JP); Koushi Kawamoto, Kanagawa (JP); Kazuo Shibuta, Kanagawa (JP); Yutaka Andoh, Kanagawa (JP); Yoshitsugu Hirose, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 955 days.

(21) Appl. No.: 11/783,207

(22) Filed: Apr. 6, 2007

(65) Prior Publication Data
US 2007/0250376 A1    Oct. 25, 2007

(30) Foreign Application Priority Data
Apr. 6, 2006   (JP) ................. 2006-105490

(51) Int. Cl.
*G06F 19/00* (2006.01)
(52) U.S. Cl. .................... 235/385; 705/10
(58) Field of Classification Search ........... 235/385; 705/10, 14.51, 14.52, 14.53, 14.54, 14.55, 705/15, 18, 22, 26
See application file for complete search history.

(56) References Cited

U.S. PATENT DOCUMENTS
6,370,513 B1 *  4/2002  Kolawa et al. ............ 705/15
2002/0184086 A1 * 12/2002  Linde ........................ 705/14

FOREIGN PATENT DOCUMENTS
| JP | 08-249441 A | 9/1996 |
| JP | 2004-030377 A | 1/2004 |
| JP | 2004-102734 A | 4/2004 |

* cited by examiner

*Primary Examiner* — Thien M Le
(74) *Attorney, Agent, or Firm* — Sughrue Mion, PLLC

(57) ABSTRACT

A medium evaluation method for evaluating a commodity information provision medium that commodity consumers expect to use as an acquisition unit of commodity information provided by a commodity provider at each step of a purchase process wherein: expectation information is associated with kinds of commodity information provision media that commodity consumers expect to use at each step of the purchase process, and access information is used to access the consumers from whom the expectation information is acquired, the method includes: in response to specifying a certain commodity information provision medium at a certain step of the purchase process in the expectation information, specifying access information of a consumer who expects to use the specified commodity information provision medium at the specified step of the purchase process from the access information.

10 Claims, 28 Drawing Sheets

FIG. 6
IMAGE REPRESENTATION DATABASE

| INFORMATION REPRESENTING IMAGE |
|---|
| ACTIVE |
| OBEDIENT |
| SWANKY |
| NATURAL |
| INTELLECTUAL |
| ⋮ |

FIG. 7
IMAGE EVALUATION DATABASE

| INFORMATION REPRESENTING IMAGE | MODERN | NATURAL | DYNAMIC | ELEGANT | PRETTY | DANDY | ... |
|---|---|---|---|---|---|---|---|
| ACTIVE | 0.1 | 0.9 | 0.5 | | | 0.4 | ... |
| OBEDIENT | | | | | 0.1 | | ... |
| SWANKY | | | | 1.0 | | | ... |
| ......... | ......... | ......... | ......... | ......... | ......... | ......... | ......... |

10-2

DESIGN IMAGE EVALUATION

EVALUATE WEB PAGE DESIGN

INPUT URL [ fujizerox.**.*.co.jp ] 30

32 — [ IMPORT WEB ]

IMPORT BY SCANNER AND EVALUATE DESIGN

34 — [ IMPORT IMAGE ]

DESIGN DATABASE

DESIGN IDENTIFICATION NO.: 9

| IDENTIFICATION NO. | DATA | DESIGN IMAGE INFORMATION |
|---|---|---|
| **...co.jp | IMAGE DATA A | NATURAL |
| fujizerox.**.*.co.jp | IMAGE DATA B | CASUAL |
| **...co.jp | IMAGE DATA C | NATURAL |
| **...co.jp | IMAGE DATA D | CLASSIC |
| ⋮ | ⋮ | ⋮ |

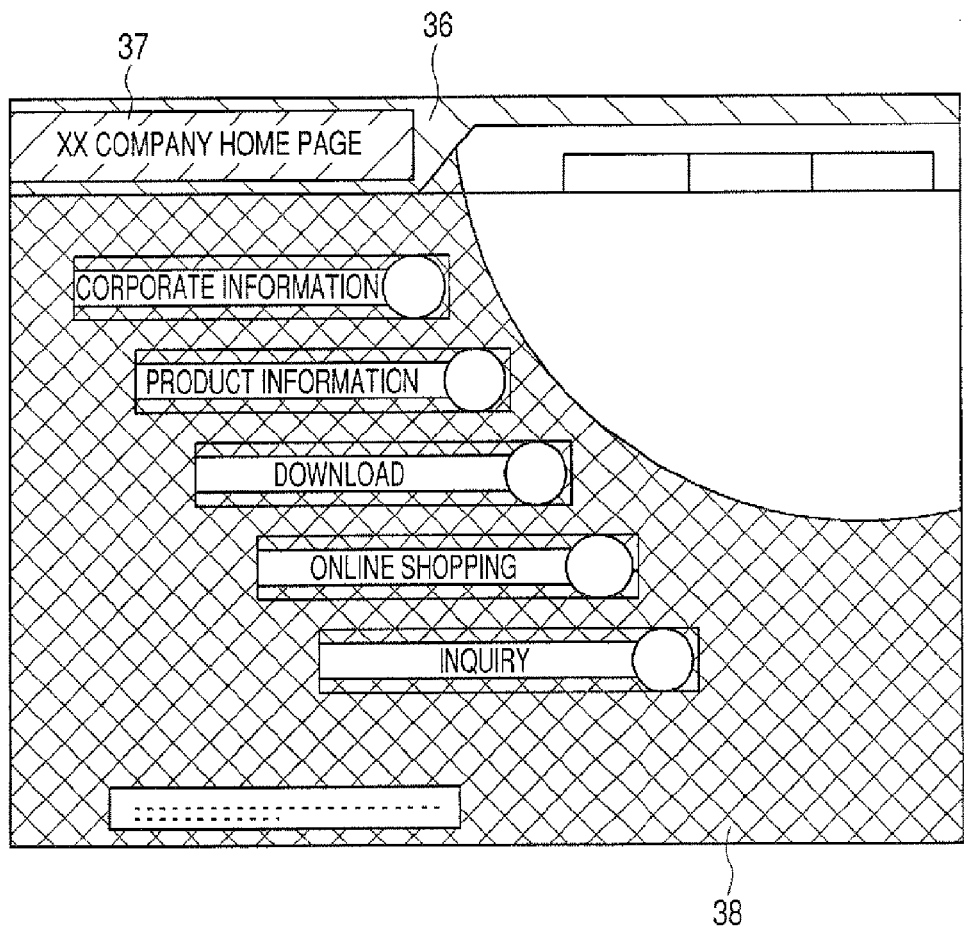

FIG. 12

IMAGE DATA SELECTION

- ☐ 1  **...co.jp    IMAGE DATA A
- ☑ 2  fujizerox.**.*.co.jp  IMAGE DATA B
- ☐ 3  **...co.jp    IMAGE DATA C
- ☐ 4  **...co.jp    IMAGE DATA D

USER IMAGE INPUT

XX COMPANY HOME PAGE
- CORPORATE INFORMATION
- PRODUCT INFORMATION
- DOWNLOAD
- ONLINE SHOPPING
- INQUIRY

- ☑ ACTIVE
- ☐ OBEDIENT
- ☑ SWANKY
- ☐ NATURAL
- ☐ INTELLECTUAL
- ☐ MILD
- ☐ WEALTHY
- ☐ DYNAMIC

[ OK ]

FIG. 14
DESIGN DATABASE

DESIGN IDENTIFICATION NO.: 9

| IDENTIFICATION NO. | DATA | DESIGN IMAGE INFORMATION |
|---|---|---|
| fujizerox.**.*.co.jp | IMAGE DATA B | NATURAL |
| **...co.jp | IMAGE DATA C | CASUAL |
| **...co.jp | IMAGE DATA D | CLASSIC |
| ⋮ | ⋮ | ⋮ |

DISPLAY SELECTION

DESIGN IDENTIFICATION NO. [ 9 ] ~54

50
☑ TARGET IMAGE DETERMINATION
☑ DESIGN IMAGE EVALUATION
☑ USER IMAGE ACQUISITION   ~5

52~ [ OK ]

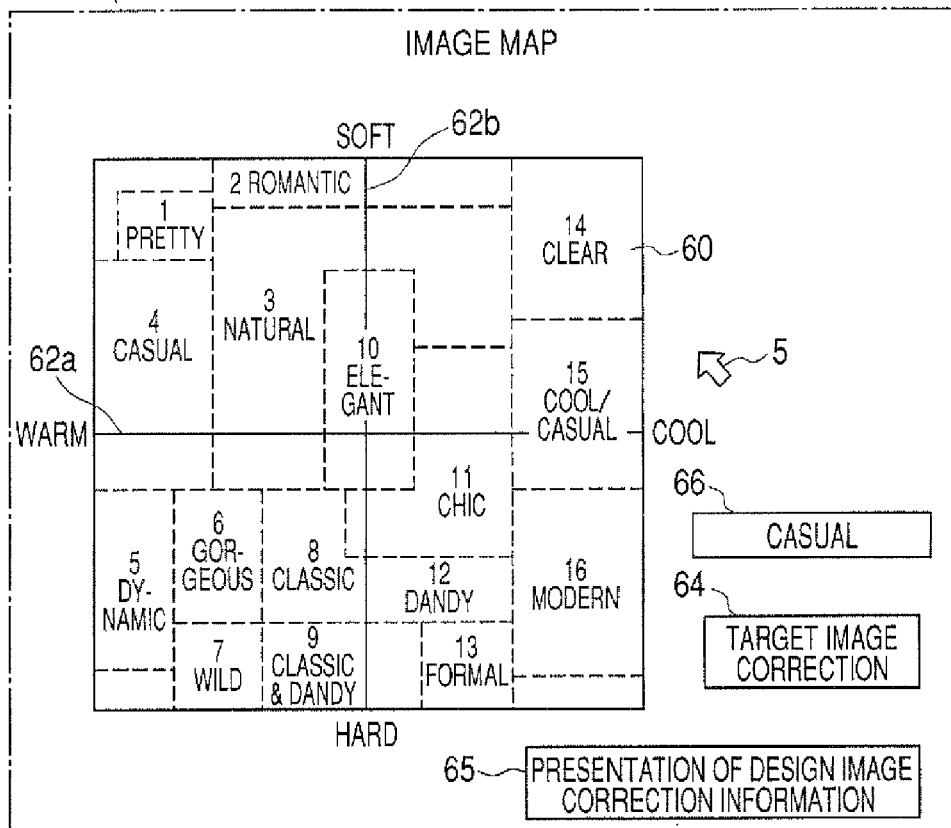

FIG. 27

| | | | ATTENTION | EXCITE INTEREST | COMMODITY UNDER-STANDING | PURCHASE CONSIDERATION | | PURCHASE | SUPPORT FOR PRACTICAL USE | |
|---|---|---|---|---|---|---|---|---|---|---|
| | | | (1) WHEN COLLECTING GENERAL INFORMATION ON OVERALL CAR LIFE | (2) WHEN COLLECTING GENERAL INFORMATION ON CAR ITSELF | (3) WHEN COLLECTING INFORMATION ON SPECIFICATION OF CAR OF INTEREST | (4) WHEN COMPARING CAR OF INTEREST WITH COMMODITIES OF OTHER COMPETING COMPANIES | (5) WHEN NEGOTIATING PRICE FOR CAR SELECTION | (6) WHEN ACTUALLY DETERMINING CAR SELECTION | (7) WHEN REQUESTING REPAIR/REPAIR PARTS OR CLAIMING | (8) WHEN RECOMMENDING PURCHASED CAR TO OTHER PERSON (FRIEND) |
| PUBLIC | (1) | NEWSPAPER/INSERTION | 21 | 14 | 0 | 10 | 4 | 2 | 0 | 2 |
| | (2) | MAGAZINE/AUTOMOBILE MAGAZINE | 25 | 17 | 9 | 5 | 22 | 17 | 4 | 10 |
| | (3) | TV CM/RADIO CM | 1 | 7 | 5 | 3 | 0 | 2 | 0 | 4 |
| | (4) | STREET POSTER/TRAFFIC AD | | | | | 0 | 1 | 0 | 2 |
| INTERNET | (5) | SITE PROVIDED BY MANUFACTURER | | | | | 15 | 16 | 6 | 10 |
| | (6) | SITE RELATING TO AUTOMOBILE OTHER THAN SITE PROVIDED BY MANUFACTURER | | 22 | 25 | 29 | 20 | 11 | 4 | 4 |
| | (7) | NETWORK MARKETING SITE | 11 | 12 | 10 | 16 | 12 | 7 | 5 | 6 |
| | (8) | BLOG/BOARD SITE | 2 | 0 | 8 | 8 | 5 | 2 | 2 | 3 |
| | (9) | E-MAIL MAGAZINE/MAILING LIST | 10 | 7 | 5 | 2 | 2 | 1 | 1 | 3 |
| | (10) | PORTABLE WEB SITE | 4 | 3 | 2 | 0 | 1 | 2 | 1 | 3 |
| DM/CATALOG | (11) | DIRECT MAIL BY POSTING | | 6 | 3 | 2 | 1 | 3 | | |
| | (12) | CATALOG OF MANUFACTURER/PAMPHLET | | | | | 15 | 10 | 3 | 20 |
| | (13) | STORE FLIER | | 9 | 0 | 4 | 0 | 4 | | |
| EVENT | (14) | EXHIBITION OF MANUFACTURER/NEW PRODUCT PRESENTATION | | 17 | 0 | 11 | 1 | 1 | | |
| | (15) | STORE SHOWROOM | | | 24 | 21 | 19 | 16 | 9 | |
| | (16) | USER CAR STORE SHOW SPACE | | 9 | 5 | 5 | 2 | 0 | | |
| ESTI-MATE | (17) | ESTIMATE/PROPOSAL | | 11 | 25 | 18 | 3 | 2 | | |
| PHONE | (18) | CALL CENTER/FREE DIAL | | 1 | 2 | 1 | 7 | 0 | | |
| SALES CLERK | (19) | TALK WITH SALES CLERK OF STORE | | 11 | | | | | 4 | |
| | (20) | PHONE TO SALES CLERK OF STORE | | 1 | 10 | 4 | 2 | 5 | | |
| | (21) | E-MAIL TO SALES CLERK OF STORE | | 3 | 1 | 2 | 2 | | | |
| PERSONAL COMMUNI-CATION | (22) | ADVICE OF FAMILY AND FRIEND | | 15 | 14 | 17 | 8 | | | |
| DOCU-MENT | (23) | CONTRACT/MANUAL ETC. | | 2 | 3 | 3 | 1 | 2 | | |

CLUS3 (N=77)

23 MEDIA FORMING CONTACT

8 PROCESSES WHEN PURCHASING CAR

A I D M A

76: 40%
77: 30%
78: 20%

| | | PROCESS | |
| --- | --- | --- | --- |
| | | ATTENTION | EXCITE INTEREST |
| MEDIA | PUBLIC | 25 | 30 |
| | THE INTERNET | 5 | 20 |
| | ENTERPRISE WEB | 10 | 10 |
| | DIRECT MAIL | 20 | 60 |

| USER ID | USER CONTACT INFORMATION | REPLY TO QUESTIONNAIRE | ------ |
| --- | --- | --- | --- |
| ⋮ | ⋮ | ⋮ | ⋮ |

MEDIUM EVALUATION METHOD

CROSS-REFERENCE TO RELATED APPLICATIONS

This application is based on and claims priority under 35 U.S.C. §119 from Japanese Patent Application No. 2006-105490 filed Apr. 6, 2006.

BACKGROUND

1. Technical Field

The invention relates to a medium evaluation method that supports a commodity provider so that the commodity provider can provide commodity information by an appropriate medium in a purchase process of commodity purchase.

Moreover, the invention covers not only a commodity of a tangible entity, but also intangible entities represented by service. Further, the "consumer" used herein may be a concept including a person (latent consumer) who does not purchase but possibly purchase, as well as a person who actually purchase a commodity.

2. Related Art

A commodity provider who sells commodities, such as an enterprise, provides information about the commodities using various media.

For example, the commodity provider provides information about a commodity using various media such as providing information by newspaper insertions, TV CM, Internet, sales by direct mail, exhibition and telephone, and direct sales with a sales clerk. Then, the consumer obtains the commodity information through such media and considers whether or not to purchase the commodity.

In the commodity information provision method, design of the media is a component that considerably affects an image (impression) that the consumer receives from the commodity. It is important to have design that gives an impression to increase a consumer's desire to purchase.

In order to create design of such a medium, many kinds of application software that supports image drawing or coloring of products, presentation materials, Web pages, or the like have been developed.

Such application software entrusts actual coloring with a user. Accordingly, a user who is unfamiliar with design production does not accurately represent an image.

SUMMARY

According to an aspect of the invention, a medium evaluation method for evaluating a commodity information provision medium that commodity consumers expect to use as an acquisition unit of commodity information provided by a commodity provider at each step of a purchase process relating to commodity purchase, wherein expectation information is associated with kinds of commodity information provision media that commodity consumers expect to use at each step of the purchase process, and access information is used to access the consumers from whom the expectation information is acquired, the method includes: in response to specifying a certain commodity information provision medium at a certain step of the purchase process in the expectation information, specifying access information of a consumer who expects to use the specified commodity information provision medium at the specified step of the purchase process from the access information; and enabling to provide the commodity information by the specified commodity information provision medium at the specified step of the purchase process, based on the specified access information of the consumer.

BRIEF DESCRIPTION OF THE DRAWINGS

Exemplary embodiments of the invention will be described below in detail with reference to the accompanying drawings, wherein:

FIG. 6 is a diagram illustrating an image representation database according to the exemplary embodiment of the invention;

FIG. 7 is a diagram illustrating an image evaluation database according to the exemplary embodiment of the invention;

FIG. 10 is a diagram showing an example of a Web page (commodity information provision medium) according to the exemplary embodiment of the invention;

FIG. 11 is a diagram illustrating a design evaluation database according to the exemplary embodiment of the invention;

FIG. 12 is a diagram showing an image data selection screen of the commodity information provision medium according to the exemplary embodiment of the invention;

FIG. 13 is a diagram showing a user image input screen according to the exemplary embodiment of the invention;

FIG. 14 is a diagram illustrating a user image information database according to the exemplary embodiment of the invention;

FIG. 15 is a diagram showing a display selection screen according to the exemplary embodiment of the invention;

FIG. 16 is a diagram showing an image map screen according to the exemplary embodiment of the invention;

FIG. 17 is a diagram illustrating an image display database according to the exemplary embodiment of the invention;

FIG. 27 is a diagram showing an AP×RP matrix according to the exemplary embodiment of the invention;

DETAILED DESCRIPTION

The exemplary embodiments of the invention will be described below.

Figure 1:
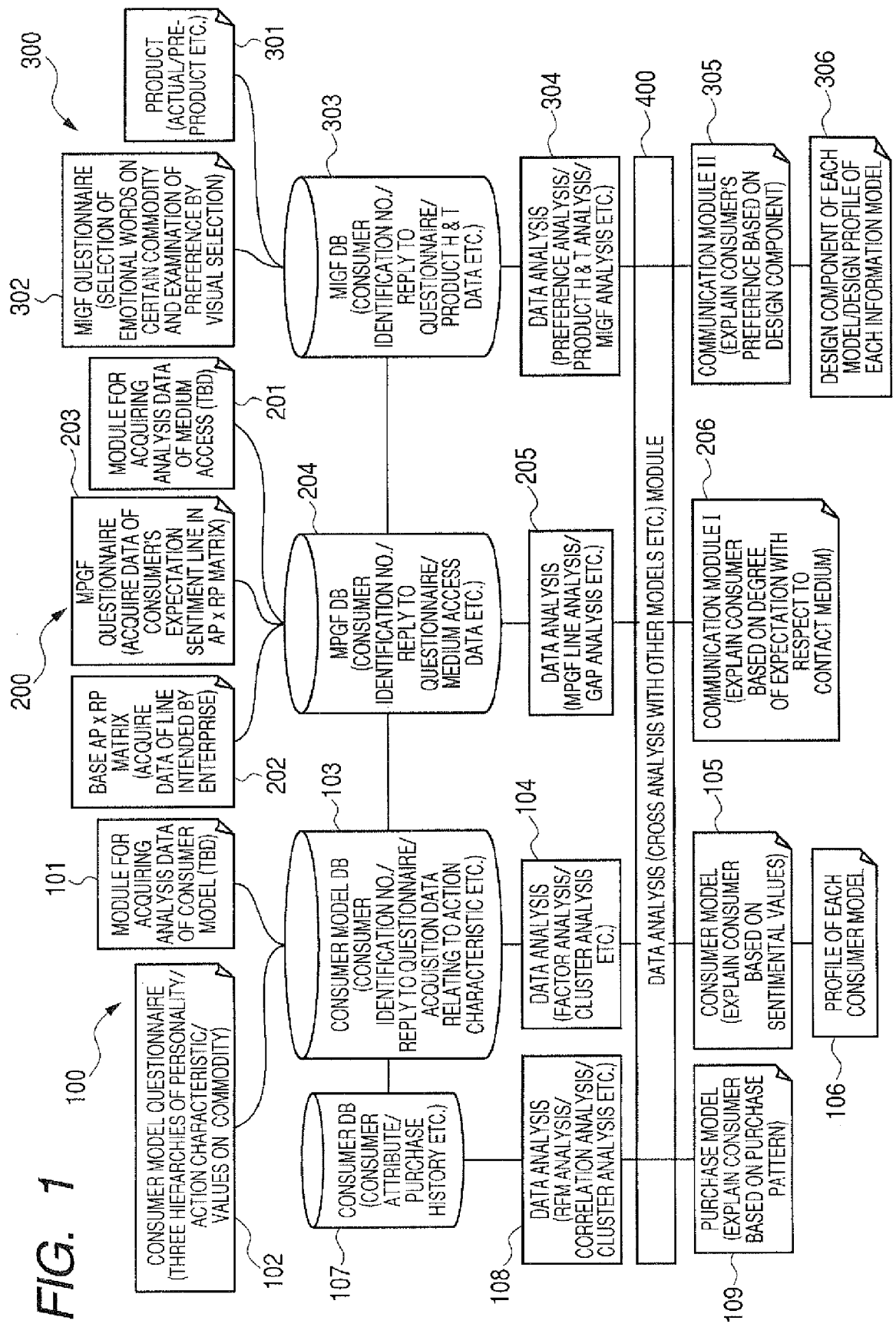
FIG. 1 is a diagram illustrating the outline of a processing according to an exemplary embodiment of the invention.

FIG. 1 shows the overall outline of the exemplary embodiment of the invention. First, the outline of a processing according to the exemplary embodiment of the invention will be described with reference to the drawings.

An analysis processing of the exemplary embodiment includes a portion 100 relating to a consumer (user), a portion 200 relating to a gap in a purchase process of a medium, and a portion 300 relating to design of the medium.

Moreover, if necessary, the portion 200 relating to the purchase process of the medium may be referred to as "MPGF" (Media Process Gap Finding), and the portion 300 relating to design of the medium may be referred to as "MIGF" (Media Image Gap Finding).

The main portions of the exemplary embodiment are the MPGF 200 and the portion 100 relating to the consumer model.

In the portion 100 relating to the consumer model, a consumer model analysis module 101 performs data analysis 104 on replies 102 (for example, replies to factors, such as personality, action characteristic, and values on commodity) to a questionnaire collected from the consumers by a known method, such as factor analysis or cluster analysis with reference to the consumer model DB 103. Then the consumer model analysis module 101 specifies a consumer model 105 of the plural consumers clustered on the basis of the factors by using this analysis.

The consumer model 105 is model information that represents similar consumers on the basis of the factors, such as personality, action characteristic, values on commodity. This can be used as information that explains the clustered consumers by sentimental values.

In the following embodiment, the result of the questionnaire collected from the consumers or the result of the data analysis is recorded as user information and then used in an MPGF processing or an MIGF processing regarding the individual consumers or the clustered consumers (consumer model).

Moreover, for convenience, a profile 106 may be created for each consumer model. Further, for a consumer whose personality is understood through previous commodity purchase, a consumer attribute or purchase history information may be stored in a consumer DB 107. Then, the information is subject to data analysis 108 by a known method, such as RFM analysis, correlation analysis, or cluster analysis. Thereby, a purchase model 109 of plural consumers clustered on the basis of the factors is generated by the analysis. The consumer information or the purchase model information may be used as the consumer or the consumer model.

In the portion 200 relating to the MPGF processing, a medium access analysis module 201 records AP×RP matrix data 202 acquired from the commodity provider and AP×RP matrix data 203 acquired from the replies to the questionnaire of the consumers in an MPGF DB 204. The recorded information is subject to data analysis 205 by MPGF analysis or GAP analysis, thereby generating a matrix-shaped communication model 206.

The AP×RP matrix data 202 acquired from the commodity provider includes information on how much (money or the number of investment times) an enterprise (commodity provider) invests (or wants to invest) at each step of a purchase process for respective kinds of media in order to provide information about a certain commodity. The AP×RP matrix data 202 represents a method, intended by the enterprise, of providing commodity information.

The AP×RP matrix data 203 acquired from the replies to the questionnaire of the consumers includes kinds of media that the consumers will probably use or used to acquire the information about the certain commodity at each step of the purchase process. The AP×RP matrix data 203 represents a method of providing commodity information that the consumers expect to use in considering of commodity purchase.

The AP×RP matrix is matrix information having two axes of the media that provide commodity information (access point: AP) and the steps of the purchase process (relational point; RP). In the AP×RP matrix data 202, the investment amount for each medium according to the intention of the commodity provider is recorded at the intersections of the AP×RP matrix in numeric values. In the AP×RP matrix data 203, the degree for each medium to which extent the consumers expect to use is recorded in the intersections of the AP×RP matrix data 203 in numeric values.

During the data analysis 205, performed is a processing of analyzing a line (estimated purchase line), which connects predetermined investment amount points of the AP×RP matrix data 202 between the process steps, and a line (estimated sentiment line), which connects predetermined expectation amount points of the AP×RP matrix data 203. The estimated purchase line is a line that directly represents the degree to which extent the commodity provider intends, and the estimated sentiment line is a line that directly represents the degree to which extent the consumers expect to use. The lines are generated according to degrees setup in the analysis (the degree may be maximum range).

The communication model 206 is a model in which the matrix of the AP×RP matrix data 202 and the matrix of the AP×RP matrix data 203 are displayed on a screen in an overlap manner. Accordingly, visualized is a gap between a commodity information provision method intended by the commodity provider and a commodity information provision method which is expected to be used or was practically used by the consumer.

Further, the estimated purchase line and the estimated sentiment line are also displayed in the communication model 206. A mark, such as 'GAP', is displayed in a portion where a gap between the lines is equal to or larger than a predetermined degree. Moreover, during the data analysis 205, the portion to be marked is specified on the basis of the setup gap amount, and a predetermined mark is displayed.

In the portion 300 relating to the MIGF processing, medium product data 301 for information provision of a certain commodity and data 302 representing image (representation by emotional words or representation by color selection) for the certain commodity acquired from the replies to the questionnaire of the consumer is recorded in an MIGF DB 303. Then, the recorded information is subject to data analysis 304 by preference analysis, product H/T analysis, or MIGF analysis so as to analyze information representing an image of the medium product and information representing an image based on the consumer's preference. Thereby, generated is a communication model 305 in which the information representing the image overlaps on an image map.

The communication model 305 uses a known concept information matrix (for example, Japan Color & Design Research Institute, Inc.) that represents image in association with emotional words (adjective), a single color, coloration of a combination of plural colors, and a shape of a cup. The communication model 305 is a model in which information, such as emotional words or coloration acquired from the image of the medium product for commodity information provision, and information, such as the emotional word or coloration of the image based on the consumer's preference acquired from the replies to the questionnaire are superimposed on the image map of the two-axis representation of, for example, "soft"-"hard" and "warm"-"cool." When this model is displayed on the screen, visualized is a gap between the design of the medium which the commodity provider uses to provide commodity information and the image that the consumers prefer (or the image that matches the commodity).

The communication model 206 generated by the MPGF processing 200 and the communication model 305 generated by the MIGF processing 300 are subject to data analysis 400 by cross analysis. Then, the MPGF model and the MIGF model can be collaborated with each other. Accordingly, it is possible to evaluate whether or not commodity information can be timely provided by design of medium and a kind of medium that the consumers prefer. In addition, commodity information can be provided by a method that the consumers prefer or that the consumers desires by changing the kind of a medium or changing design of the medium.

<Configuration of Purchase Process Apparatus>

Figure 2:
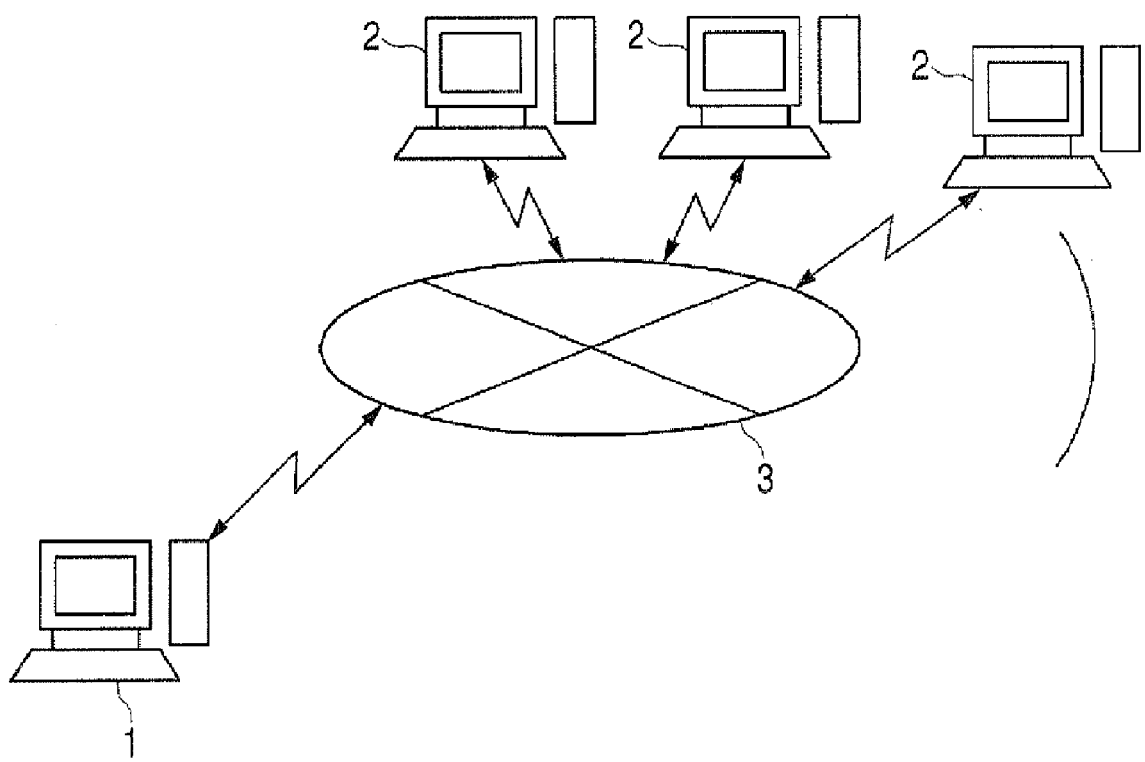
FIG. 2 is a diagram showing the system configuration according to the exemplary embodiment of the invention.

FIG. 2 shows the concept of a system according to this exemplary embodiment. The system of this exemplary embodiment has management server 1 and client computers 2 that are connected to each other through a network 3.

Moreover, the management server 1 has known computer hardware, such as a processor or a memory. When a purchase evaluation program according to the exemplary embodiment of the invention is executed by hardware, the functions of the invention are configured, as described below. That is, the management server 1 forms a purchase evaluation apparatus that visualizes a gap between commodity information to be provided by the commodity provided in a purchase process related to commodity purchase and commodity information to be desired by the consumer of the commodity in, the purchase process (in this exemplary embodiment, the management server 1 also forms a design evaluation apparatus).

Figure 3:
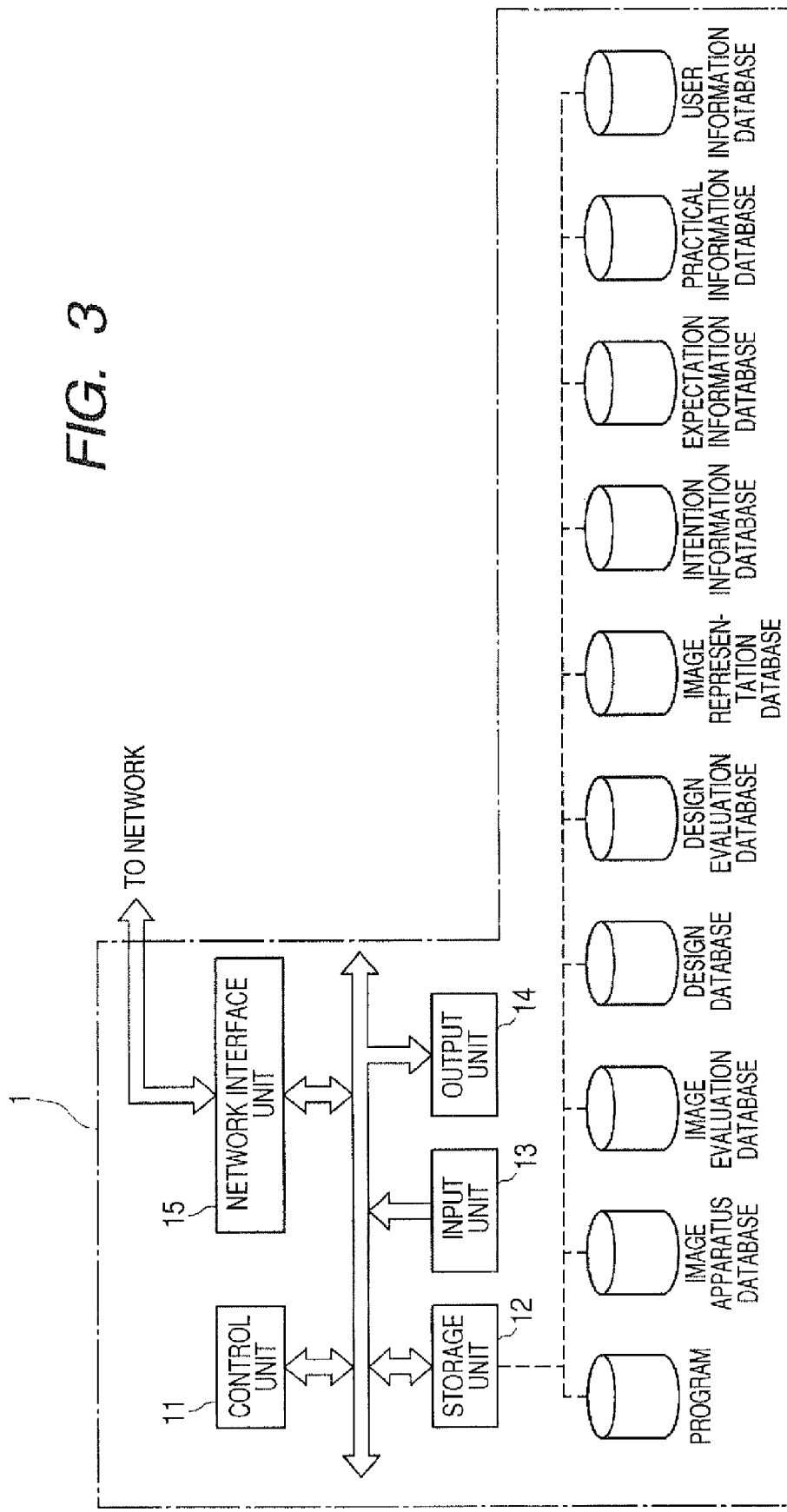
FIG. 3 is a diagram showing the configuration of a management server (evaluation apparatus) according to the exemplary embodiment of the invention.

As shown in FIG. 3, the management server 1 includes a control section 11 that executes a processing by the functions described below, a storage section 12, an input section 13 that receives an operation input from an operator, an output section 14 that displays information to be presented to the operator on a screen, and a network interface unit 15.

The control section 11 reads out and executes a program according to this exemplary embodiment stored in the storage section 12, imports data required for the processing from the input section 13 or the network 3, and stores data in the storage section 12. Further, if necessary, the control section 11 reads out data stored in the storage section 12, performs a processing, stores the processing result in the storage section 12 again, and outputs data to the output section 14 or the network 3.

The storage section 12 stores and holds the program of this exemplary embodiment and various data imported from the input section 13 or the network 3. Further, the storage section 12 stores and holds databases required for the processing of this exemplary embodiment, such as an image representation database, an image evaluation database, a design database, a design evaluation database, an image representation database, an intention information database, an expectation information database, a practical information database, and a user information database. As the storage section 12, a semiconductor memory is mainly used, but a storage device, such as a hard disk, an optical disk, a magneto-optical disk, or a magnetic disk, may be used.

Although the contents and the use methods of the individual databases stored in the storage section 12 will be described below, in summary, the image representation database, the image evaluation database, the design database, the design evaluation database, and the image representation database are mainly used for the MIGF processing by the portion 300 relating to the MIGF processing. Further, the intention information database, the expectation information, database, and the practical information database are mainly used for the MPGF processing by the portion 200 relating to the MPGF processing. In addition, the user information database is mainly used for the user clustering processing by the portion 100 relating to the consumer model.

The input section 13 is used when the operator inputs data required for the processing. As the input section 13, for example, a character input device, such as a keyboard, or a pointing device, such as a mouse or a light pen, may be used.

Further, when an existing presentation material written on a recording medium, such as a paper, is read as electronic data, an image reading device, such as a scanner, may be used. In addition, when a voice is input, a voice input device that can convert the voice into a digital signal may be used.

The output section 14 displays an input screen urging the input of data required for the processing or an output screen that displays the processing result by the control section 11. As the output section 14, for example, an image output device, such as a display or a printer, may be used.

Moreover, the client computer 2 may have the same configuration as the management server 1. Further, the client computer 2 may execute the program stored in the storage section 12 of the management server 1 through the network 3 and appropriately read out and use data.

<Description of MIGF Processing>

A design image evaluation processing (MIGF processing 300) that is executed by the client computer 2 having the above-described configuration will be described with reference to FIGS. 4 to 22.

The client computers 2 are respectively connected to the management server 1 through the network 3 and perform communications. Any client computer 2 may be used as a terminal of an operator (design evaluator or design producer).

Moreover, in the following description, for convenience, it is assumed that the operator operates the management server 1 to perform the processing.

Further, a main menu that selectively starts the MIGF processing, the MPGF processing, and the user clustering processing is displayed on the output section 14 of the management server 1. Then, the operator selects and instructs a desired processing from the input section 13, and the selected processing is executed.

Figure 4:
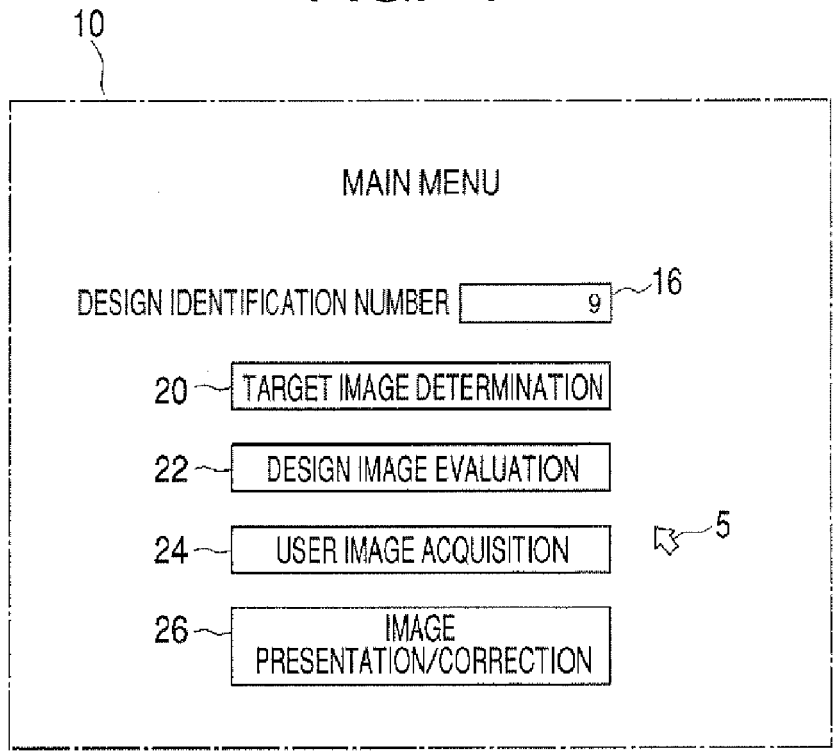
FIG. 4 is a diagram showing a main menu screen of an MIGF processing according to the exemplary embodiment of the invention.

The MIGF processing includes a target image determination step, a design image evaluation step, a user image acquisition step, and an image presentation/correction step. If the processing of the program starts, as shown in FIG. 4, the control section 11 causes the output section 14 to display a main menu screen 10 of the MIGF processing, and prompts the operator to select a desired processing. Here, on the main menu screen 10, a mouse pointer 5 is displayed and, if a screen position indicating a desired processing is clicked, the processing starts to be executed.

On the main menu screen 10, a box 16 for inputting an identification number of target design is provided. In the following processing, a target database is identified by the number input in the box 16.

For example, if '9' is input in the box 16 as the identification number, the mouse pointer 5 is moved to a position where a target image determination button 20 is displayed, and the mouse is clicked, the identification number of design becomes 9, and the processing of the target image determination step is executed.

<Target Image Determination Step>

In the target image determination process, information about image required for target design (hereinafter, referred to as 'target image information') is determined. In the target image determination step, first, the control section 11 causes the output section 14 to display a target image input screen 10-1 shown in FIG. 5. The target image input screen 10-1 presents plural pieces of information representing design images and allows the operator to select information corresponding to target design to be designed.

Here, as the information representing the design image, character information having a group of adjectives (emotion words) directly representing the design images and color information having a group of color palettes each consisting of a combination of plural colors can be appropriately selected and used according to an object for design production. The information may be stored in the storage section 12 as the image representation database in advance and then appropriated read out and used. In the following description, as shown in FIG. 6, it is assumed that the image representation database uses character information having a group of adjectives as emotional words.

Next, the operator selects information according to an image required for design using the input section 13.

Figure 5:
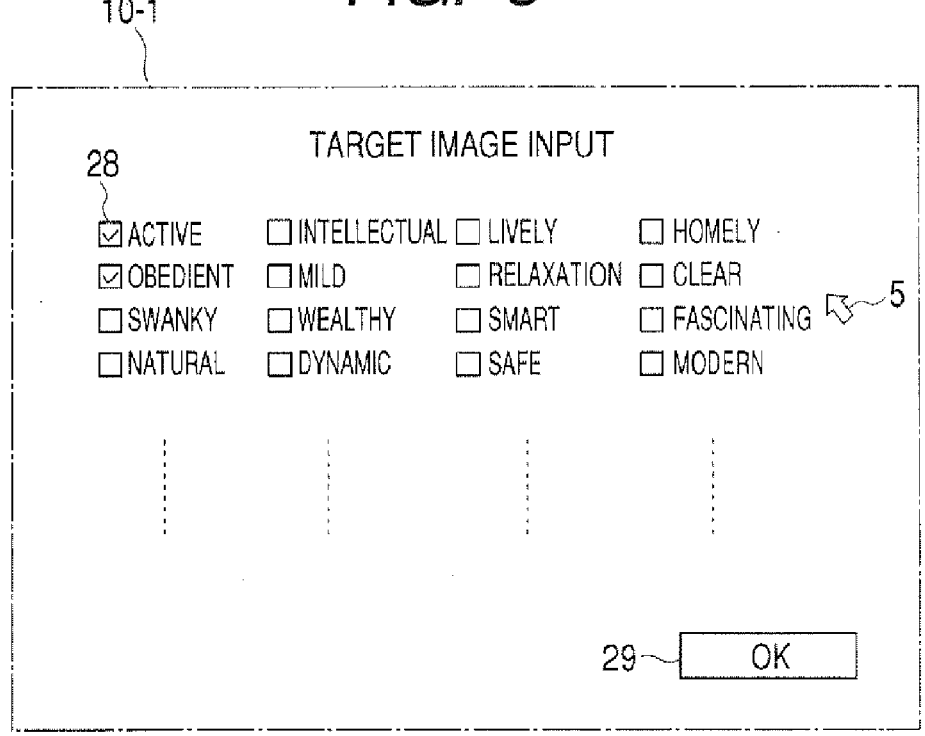
FIG. 5 is a diagram showing a target image input screen according to the exemplary embodiment of the invention.

For example, as shown in FIG. 5, the mouse pointer 5 is displayed on the target image input screen 10-1 on which adjectives are listed. Then, the operator uses a mouse as the input section 13, moves the mouse pointer 5 on a check box 28 attached to an adjective corresponding to the image required for design, and clicks the mouse to selectin formation. A check mark is displayed at the selected checkbox 28. If the selection ends, the operator moves the mouse pointer 5 to a position of an OK button 29 and clicks the mouse, such that the character information of the selected adjective is stored in the storage section 12. In the example of FIG. 6, the character information 'active' and 'obedient' are selected and stored in the storage section 12.

Moreover, the selection method of the information representing the image is not limited thereto. Another method may be used insofar as the operator can easily perform the input.

Next, the target image information of the design production is determined on the basis of the selected information. In determining of the target image information, the image evaluation database is used. As shown in FIG. 7, the target image information is held in the image evaluation database in association with information in the image representation database. For example, a given word (modern, natural, or the like) representing the image as the target image information is associated with an emotional word (adjective) in the image representation database.

The control section 11 reads out the selected information (emotional word) from the storage section 12, and refers to the image evaluation database, thereby extracting the target image information associated with the information. The extracted target image information is stored in the storage section 12 in association with the identification number of design.

For example, when the selected character information (emotional word) is 'obedient', according to the image evaluation database of FIG. 7, 'natural' and 'pretty' are selected at ratios of 0.9 and 0.1 as the target image information, respectively.

If the target image information is selected, the control section 11 ends the target image determination step.

Moreover, the processing of the target image determination step is not limited thereto. For example, when the design object includes plural colors, such as presentation material, Web page, exterior of new product, and brand logo of enterprise, a group of color palettes each consisting of a combination of plural colors may be registered as the image representation database and listed on the target image input screen, and a design production client is allowed to select one. Then, the target image information associated with the selected color palette can be selected.

<Design Image Evaluation Step>

If a design image evaluation button 22 is clicked, the processing of the design image evaluation step is executed.

In the design image evaluation step, information about image of actual design (hereinafter, design image information) is extracted.

First, actual design is imported as data, and stored and held in the storage section 12. The control section 11 causes the output section 14 to display a design import screen 10-2 shown in FIG. 8 and prompts the operator to input data about design.

Figures 8, 9:
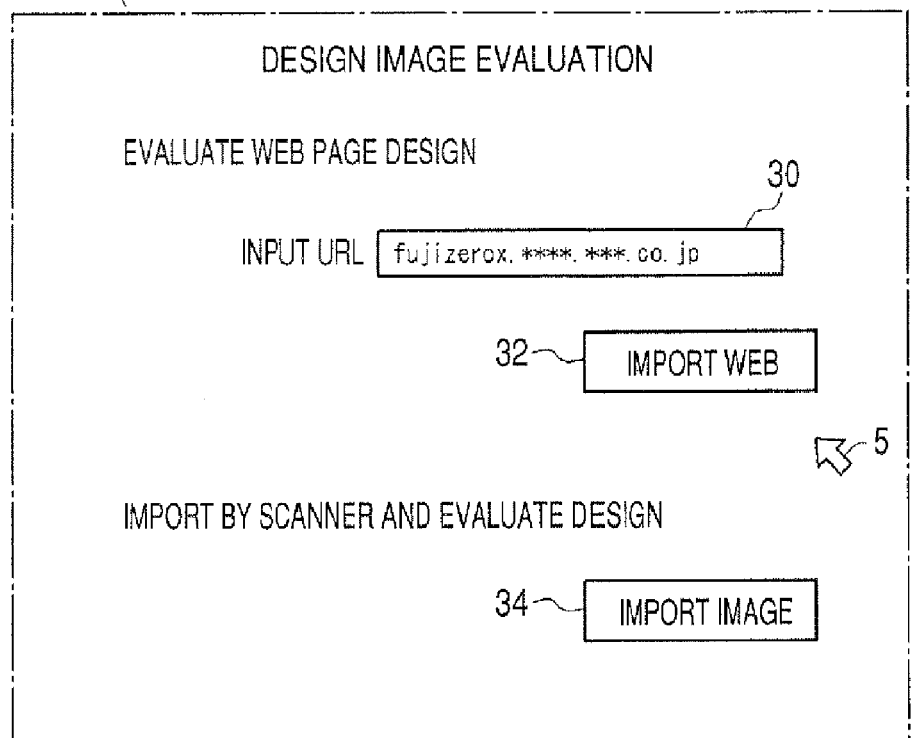
FIG. 8 is a diagram showing a design image evaluation screen according to the exemplary embodiment of the invention.
FIG. 9 is a diagram illustrating a design database according to the exemplary embodiment of the invention.

For example, the operator designs a Web page for providing commodity information and uploads it on the network 3 in advance. Next, a URL of the Web page is input in a URL input box 30 of the design import screen 10-2, the mouse pointer 5 displayed on the design import screen 10-2 is moved to a Web design import button 32, and the mouse is clicked. Then, an acquisition destination of the Web page subject to the design image evaluation is specified. When receiving the specifying, the control section 11 imports image data of the Web data from the specified URL through the network 3. As shown in FIG. 9, the imported image data is sequentially stored in the storage section 12 as the design database in association with identification information (for example, URL) of the image data.

Moreover, for the design identification number, when the design database is not generated yet, a new design database is generated in association with the design identification number. Meanwhile, when the design database for the design identification number exists already, the identification number of image data and the image data are additionally stored in the existing design database.

Further, when the object of design production is a presentation material, an advertisement of a new product, image data may be imported (acquired) using a reading apparatus of image data, such as a scanner. In this case, when an image import button 34 of the design import screen 10-2 is clicked, an existing image reading tool may start.

For example, when an image of a Web page for providing commodity information shown in FIG. 10 is imported, an image that a human feels from the imported image data is evaluated. In the design image evaluation, existing evaluation means disclosed in JP 2004-30377 A may be used.

That is, the control section 11 reads out the imported image data from the storage section 12, and divides it into plural regions, as shown in FIG. 10. For the division, an existing image region division tool may be used. Next, physical characteristic amounts, such as area, position, size, color average, and color different from other regions, are extracted from the divided regions.

Meanwhile, the combination of the physical characteristic amounts is stored and held in the storage section 12 as the design evaluation database in association with the design image information. For example, as shown in FIG. 11, a set of colors for a background region, a main region having the largest region other than the background region, and an accent region accented with respect to the main region (in the drawing, a hatched region) is generated and held in association with the design image information (similarly to the above description, a given word representing image (modern, natural, or the like)) that a human feels from the set of colors).

Average colors may be extracted from the background region, the main region, and the accent region of actual image data on the basis of the design evaluation database, and then the design image information may be extracted from the combination of the average colors. As shown in FIG. 9, the extracted design image information (natural, casual, or the like) is stored and held in the storage section 12 as the design database in association with the identification number of image data and the image data to be evaluated.

For example, if the average colors are extracted from the background region, the main region, and the accent region of the image data in FIG. 10, the design image information 'natural' can be found on the basis of the design evaluation database of FIG. 11.

Moreover, the physical characteristic amount itself obtained from the image data may be used as the design image information. For example, the combination itself of the average colors of the background region, the main region, and the accent region of the image data may be used as the design image information, that is, as the color palette.

If the design image is determined, the control section 11 ends the design image evaluation step.

<User Image Acquisition Step>

If a user image acquisition step button 24 is clicked, the processing of the user image acquisition step is executed.

In the user image acquisition step, a user (commodity consumer) acquires an image (hereinafter, referred to as 'user image information') with respect to the image data imported in the design image evaluation step.

First, the control section 11 causes the output section 14 to display an image data selection screen 10-3, and prompts the selection of image data which will be subject to image acquisition from among the image data imported at the design image evaluation step.

As shown in FIG. 12, the image data selection screen 10-3 may list information about the image data stored in the design database of the storage section 12 on the screen, and allow the operator to select image data to acquire user image information. However, the image data selection screen 10-3 is not limited thereto. Any one may be used insofar as it can select the image data stored in the design database.

A user who inputs image for image data (or the operator who inputs the replies to the questionnaire from the user) moves the mouse pointer 5 to a check box 40 provided in information about image data of the image data selection screen 10-3 using the input section 13, such as a mouse and clicks the mouse, thereby selecting information. Next, the mouse pointer 5 is moved on an OK button 42 and the mouse is clicked, thereby determining the selection of the image data.

Here, since the user (consumer) directly inputs the image, the control section 11 causes the output section 14 to display an image input screen 10-4 shown in FIG. 13, and prompts the user to input image from the image data.

The user image input screen 10-4 is divided into a region 43 that displays the content of the selected image data and a region 44 that lists information representing the design images.

The control section 11 reads out the selected image data from the design database stored in the storage section 12 and displays the image data in the image data display region 43 through image formation. For example, when image data of a Web page is selected, as shown in FIG. 13, the URL of the image data is read out from the design database, imports the image data from the URL, and displays the image data on the display.

In addition, the control section 11 reads out the information representing the design images from the image representation database of the storage section 12 and displays the image in the image representation display region 44.

Similarly to the target image determination step, the information representing the image in the image representation database can be appropriately selected and used from among plural adjectives representing the design images and/or color information including a color palette composed of a set of colors, according to the kind of image data. Here, it is assumed that the image information database includes character information including plural groups of adjectives.

Next, using the input section 13, the user selects information corresponding to the image that he feels when seeing design of the image data displayed in the image data display region 43.

For example, as shown in FIG. 13, the mouse pointer 5 is displayed in the image representation display region 44 where the adjectives are listed. Then, the user moves the mouse pointer 5 on a check box 46 provided with respect to an adjective corresponding to the image to be received from design and clicks the mouse so as to select the information. A check mark is displayed in the selected check box 46. Display of the adjective can be appropriately changed by moving the mouse pointer 5 on a scroll button 48 and clicking the mouse. If the selection of the adjective ends, the mouse pointer 5 is moved to a position of an OK button 47 and then the mouse is clicked, such that the character information of the selected adjective is stored in the storage section 12.

For example, in FIG. 13, the character information 'active' and 'swanky' are selected and stored in the storage section 12.

The user image acquisition method is not limited thereto. That is, it is sufficient that the user can easily input an image with respect to design of image data.

Next, user image information is determined on the basis of the selected information. In determining the user image information, the image evaluation database used in the target image determination step is used.

The control section 11 reads out the selected information from the storage section 12, and refers to the image evaluation database, thereby extracting user image information associated with the set of selected information. For example, when the character information 'swanky' is selected, 'elegant' is selected at a ratio of 1.0 as the user image information according to the image evaluation database of FIG. 7.

The extracted user image information is stored in the storage section 12 as the user image information database in association with the image data as shown in FIG. 4.

Moreover, when the user image information database is not generated yet, the user image information database is generated for each design identification number. Meanwhile, when the user image information database exists for the design identification number, image data and user image information are added to the existing user image information database.

If the user image information is determined, the control section 11 ends the user image acquisition step.

Moreover, information representing user image information is not limited to character information of an adjective as in this exemplary embodiment. For example, similarly to the target image determination step, user image information may be selected from a group of color palettes composed of a set of colors.

Further, the above-described step may be performed for plural users, and user image information for the same image data may be acquired from the plural users. Accordingly, broad and objective image evaluation on image data can be performed.

That is, when user image information are acquired from the individual users, and user information and target image information or design image information of each user are displayed in an overlap manner, it is possible to easily evaluate a gap between the preference of each user for a given medium and the target image or the design image. Then, if plural users (user information) are identifiably displayed on the screen, broad and objective image evaluation can be performed.

Moreover, as described below, when a consumer model is generated by clustering plural users according to attribute information and user information of the consumer model and the target image information or the design image information are displayed to overlap on the same screen, it is possible to easily evaluate a gap between the preference of the consumer model for given medium design and the target image or the design image.

<Image Presentation/Correction Step>

If an image presentation/correction step button 26 is clicked, the processing of the image presentation/correction step is executed.

The image presentation/correction step displays the target image information obtained in the target image determination step, the design image information obtained in the design image evaluation step, and the user image information obtained in the user image acquisition step.

First, the control section 11 causes to the output section 14 to display a display selection screen 10-5 and allows the operator to select information to display.

As shown in FIG. 15, on the display selection screen 10-5, the design identification number to be displayed is input in an input box 54. Further, when a check box 50 is selected and an OK button 52 is clicked, information to be displayed is selected from among the target image information, the design image information, and the user image information.

Next, when receiving the input of the information to be displayed, the control section 11 displays the target image information, the design image information, or the user image information on an image map screen 10-6 shown in FIG. 16.

The image map screen 10-6 is divided into plural regions, and each region is attached with an identification number. Meanwhile, in the storage section 12, information representing image (a word representing image such as pretty) is associated with each region identification number and stored as the image display database, as shown in FIG. 17.

The control section 11 refers to the image display database and extracts the region identification number associated with the target image information, the design image information, or the user image information. Then, information corresponding to the region on the image map screen 10-6 having the extracted region identification number is displayed.

Here, a coordinate axis may be provided on the image map screen 10-6, and the region identification numbers may be allocated such that the image changes at a predetermined tendency along the coordinate axis.

For example, in the example of the image map screen 10-6 shown in FIG. 16, two rectangular coordinates of an X coordinate 62a and a Y coordinate 62b are provided. The X coordinate 62a represents a degree of warmness of design from 'warm' to 'cool', and the Y coordinate 62b represents a degree of hardness from 'soft' to 'hard'. Then, information (words) representing image are allocated along with change in respective image.

Moreover, the information allocation method onto the image map screen 10-6 is not limited thereto. The setting of the coordinate axes may be changed according to the kind of object design.

Figure 18:
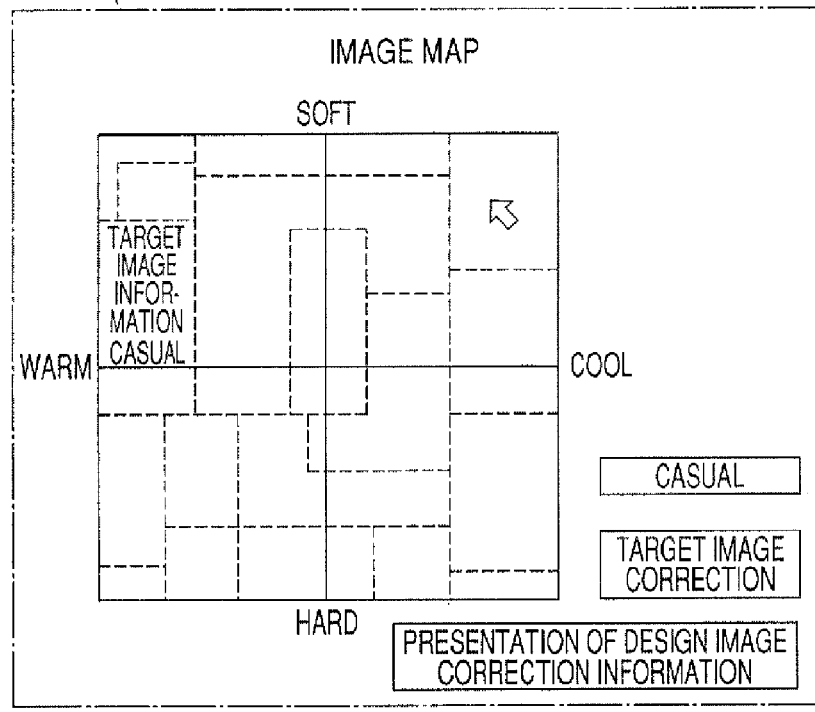
FIG. 18 is a diagram showing an image map screen, on which target image information is displayed in an overlap manner, according to the exemplary embodiment of the invention.

In the above case, when the target image information is selected, target image information associated with the input design identification number is displayed on the image map screen 10-6 in an overlap manner as shown in FIG. 18.

Figure 19:
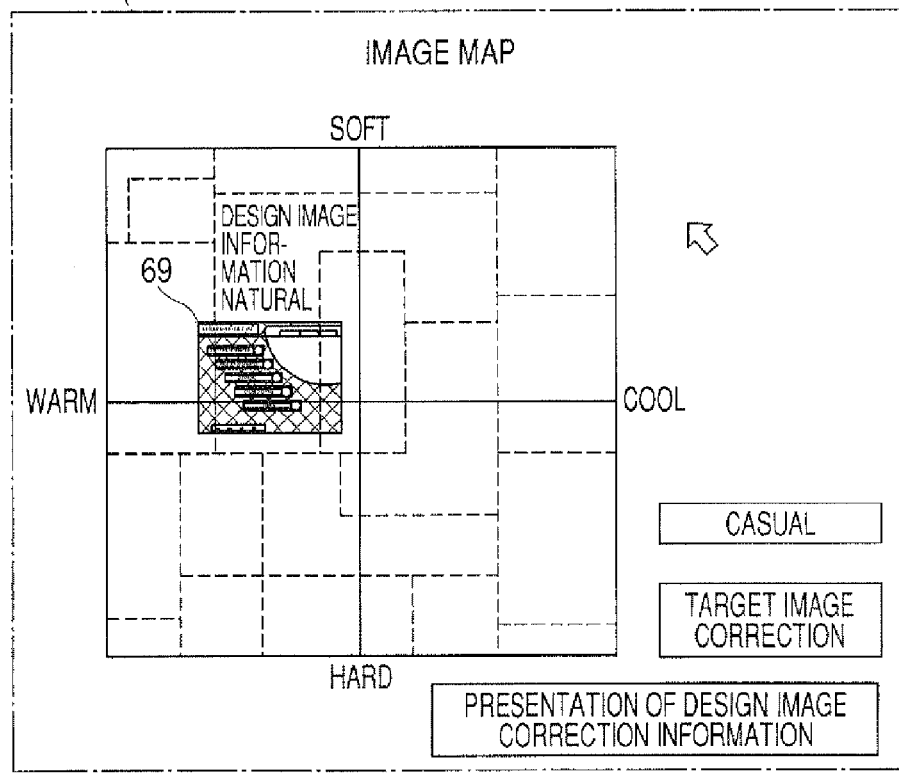
FIG. 19 is a diagram showing an image map screen, on which design image information and image data are displayed in an overlap manner, according to the exemplary embodiment of the invention.

Meanwhile, in the above case, when the design image information is selected, design image information 68 in the design database associated with the input design identification number is displayed on the image map screen 10-6 in an overlap manner as shown in FIG. 19. At this time, if a different display color is used for information of each image data stored in the design database, it is possible to easily identify the displayed information. Further, instead of the design image information or together with the design image information, image data itself corresponding to the design image information may be displayed.

Figure 20:
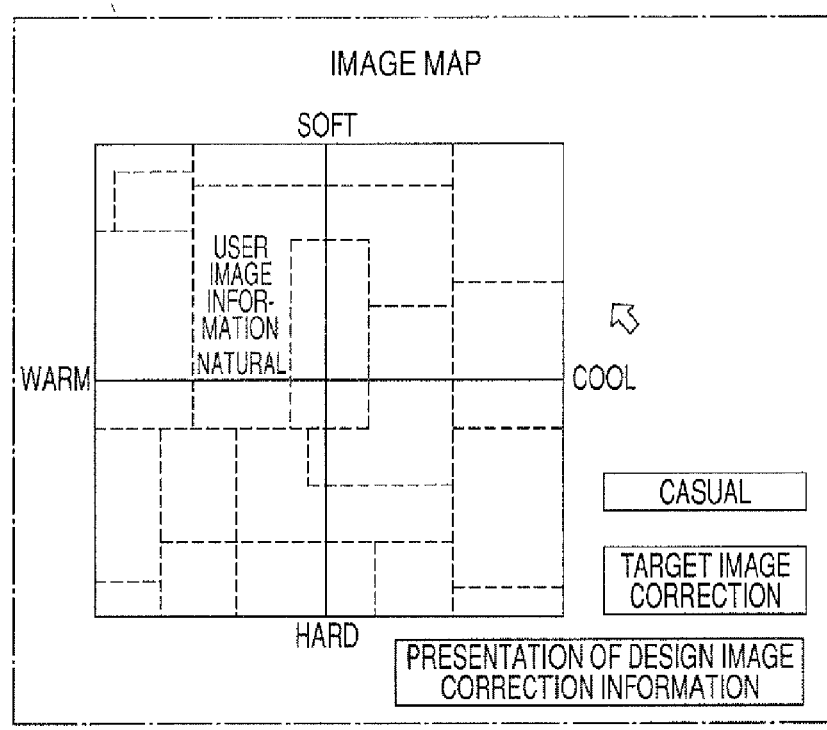
FIG. 20 is a diagram showing an image map screen, on which user image information is displayed in an overlap manner, according to the exemplary embodiment of the invention.

Meanwhile, in the above case, when the user image information is selected, user image information in the user image information database associated with the input design identification number is displayed on the image map screen 10-6 in an overlap manner as shown in FIG. 20. At this time, if a different display color is used for information of each image data stored in the user image information database, it is possible to easily identify the displayed information.

Figure 21:
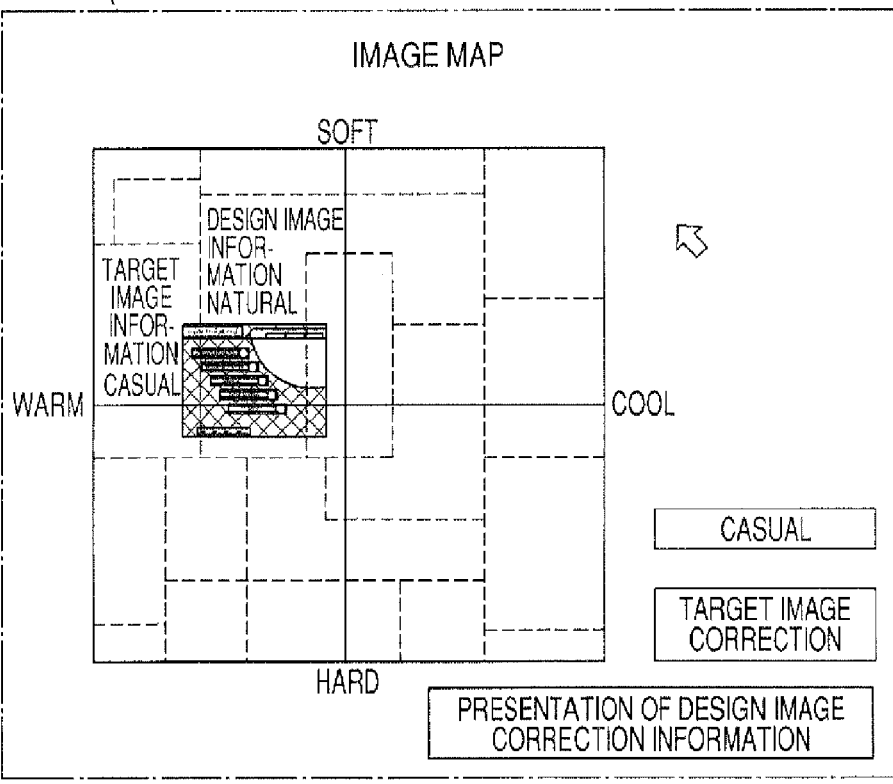
FIG. 21 is a diagram showing an image map screen, on which target image information, design image information, and image data are displayed in an overlap manner, according to the exemplary embodiment of the invention.

In addition, in the above case, when both the target image information and the design image information are selected, both target image information and design image information associated with the input design identification number are displayed on the image map screen 10-6 in an overlap manner as shown in FIG. 21. Similarly, when both the target image information and the user image information are selected, when both the design image information and the user image information are selected, or when all the target image information, the design image information, and the user image information are selected, the individual information are displayed on the image map screen 10-6 in an overlap manner.

As such, if the target image information, the design image information, and the user image information are displayed on the image map screen 10-6 in an overlap manner one by one, it is possible for the operator (for example, a design producer) to visually compare and confirm a gap among target image for design production, image of actual design and image that the user feels from the actual design. At this time, since individual information is displayed on the image map screen 10-6 along the coordinate axis indicating image tendency, it is possible to clearly understand to what extent there is a gap between the image of the actual design and the image that the user feels and what tendency the gap has.

With such display, a gap between the design image of an advertisement medium that the commodity provider (enterprise or the like) intends with respect to the commodity information and the design image of the advertisement medium that the consumer expects to receive with respect to the commodity information can be visualized and easily understood.

When a reference value representing a degree of gap input by the operator using the input section 13 is set in the control section 11, the control section 11 compares a degree of the gap between information on the image map screen 106 (for example, a coordinate value distance) with the reference value, and clearly displays the gap between the information on the image map screen 10-6 when the gap is equal to or larger than the reference value.

Figure 22:
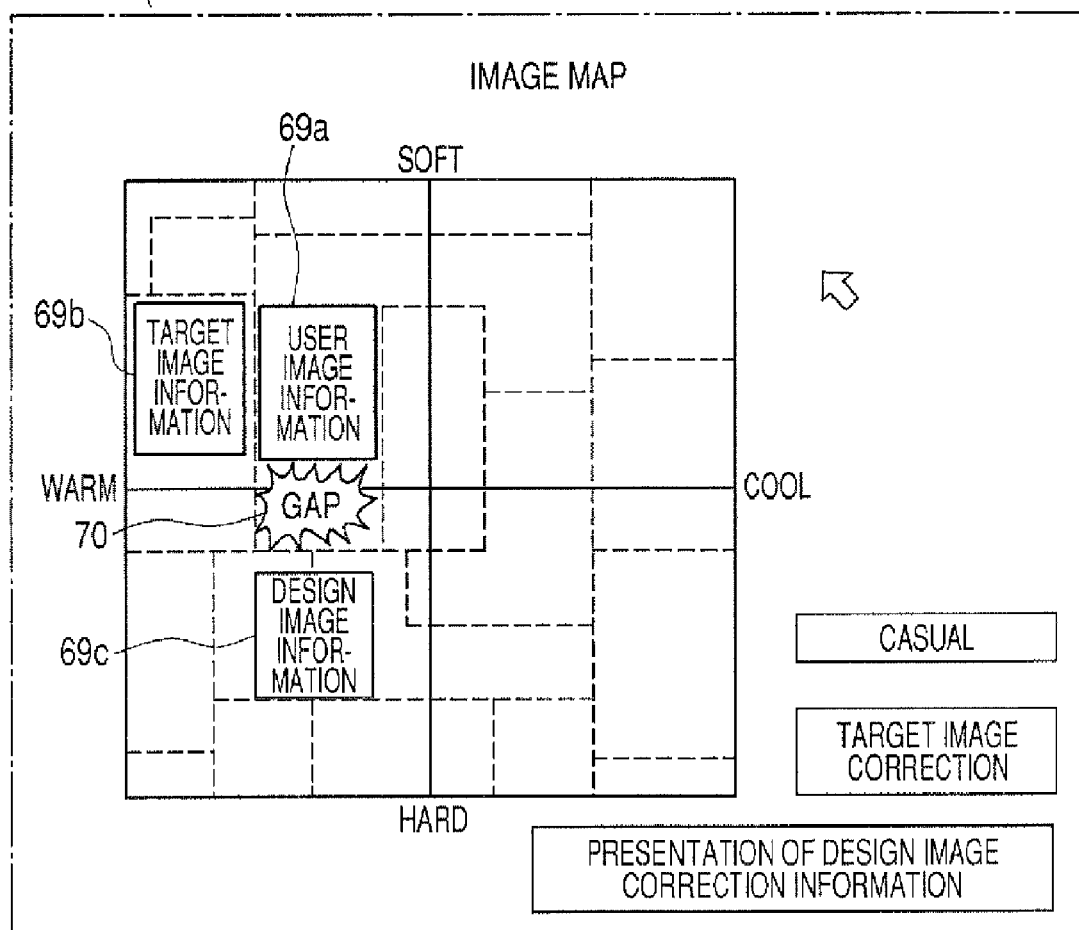
FIG. 22 is a diagram showing an image map screen, on which user image information, target image information, design image information, and image data are displayed in an overlap manner, according to the exemplary embodiment of the invention.

For example, in FIG. 22, user image information 69a, target image information 69b, and design image information 69c are displayed on the single image map screen 10-6 in an overlap manner. However, since the design image information 69c is separated apart from other information 69a and 69b, a 'GAP' mark 70 is displayed therebetween. Thus, it is possible to easily evaluate at a glance that the design image is far from the user image or the target image.

Moreover, so long as the mark that clearly expresses the information having a large gap, other marks may be used. Further, the color of a region between the information may be changed or highlighted. In summary, any method may be used insofar as the separation portion (gap portion) can be identified on the screen.

In addition, if the user image information is acquired from plural users for the same design, it is possible to easily confirm the distribution tendency of the user image information on the image map screen 10-6. Further, it is possible to confirm at a glance that the distribution tendencies of the target image information or the design image information and the user image information are consistent with each other or different from each other.

Moreover, when a color palette is used as the target image information, the design image information, and the user image information, not the adjective, color palettes may be associated with the individual regions on the image map screen 10-6, and the color palettes may be displayed in the regions corresponding to the target image information, the design image information, and the user image information.

In addition, in this exemplary embodiment, it is possible to correct the target image information or to present information useful for the correction of the design image. If the mouse pointer 5 is moved on a target image correction button 64 or a design image correction information presentation button 65 on the image map screen 10-6, and then the mouse is clicked, a correction processing is executed.

If the correction of the target image information is instructed, the control section 11 starts a setting processing of the target image information.

The operator moves the mouse pointer 5 to a region on the image map screen 10-6 and clicks the mouse while referring to the design image information or the user image information displayed on the image map screen 10-6. The control section 11 acquires the position of the mouse pointer 5 and refers to the image representation database, thereby setting information representing an image allocated to the region as new target image information. Here, in order to easily confirm the set new target image information, a region 66 that displays target image information may be provided to display the target image information.

If the above-described target image information setting method is used, for example, Web advertisement design to be conceived by the user (consumer) for a commodity is displayed on the image map screen 10-6 as design image information in an overlap manner. Then, when a target image of a Web advertisement design of the commodity to be planned (or executed) by the commodity provider is close to the design image to be conceived by the user, a region where the design image information of a Web advertisement design to be conceived by the user is specified, such that appropriate target image information can be easily set.

Further, if the mouse pointer 5 is moved on the design image correction information presentation button 65 on the image map screen 10-6, and then the mouse is clicked, it is possible to present information that the operator requires for the correction of design image information. For example, a database relating to the combination of the colors of the background region, the main region, and the accent region having design corresponding to the images allocated to the individual regions of the image map screen 10-6 may be formed. Then, a set of colors corresponding to the region where the target image information is displayed may be displayed on the image map screen 10-6 in an overlap manner. Design may be changed to the combination of displayed colors, thereby approximating the target image.

As such, if the correction of the target image information or the presentation of information useful for the design correction is performed on the same image map screen 10-6, a work can be performed while visually confirming the target image, the image of actual design, and the image the user feels.

That is, according to this exemplary embodiment, it is possible to confirm on the same image map screen that a target image for design production of a medium, which provides commodity information, an image of actual design of the medium, and an image the user feels from actual design of the medium are consistent with each other or different from each other.

Figure 23:
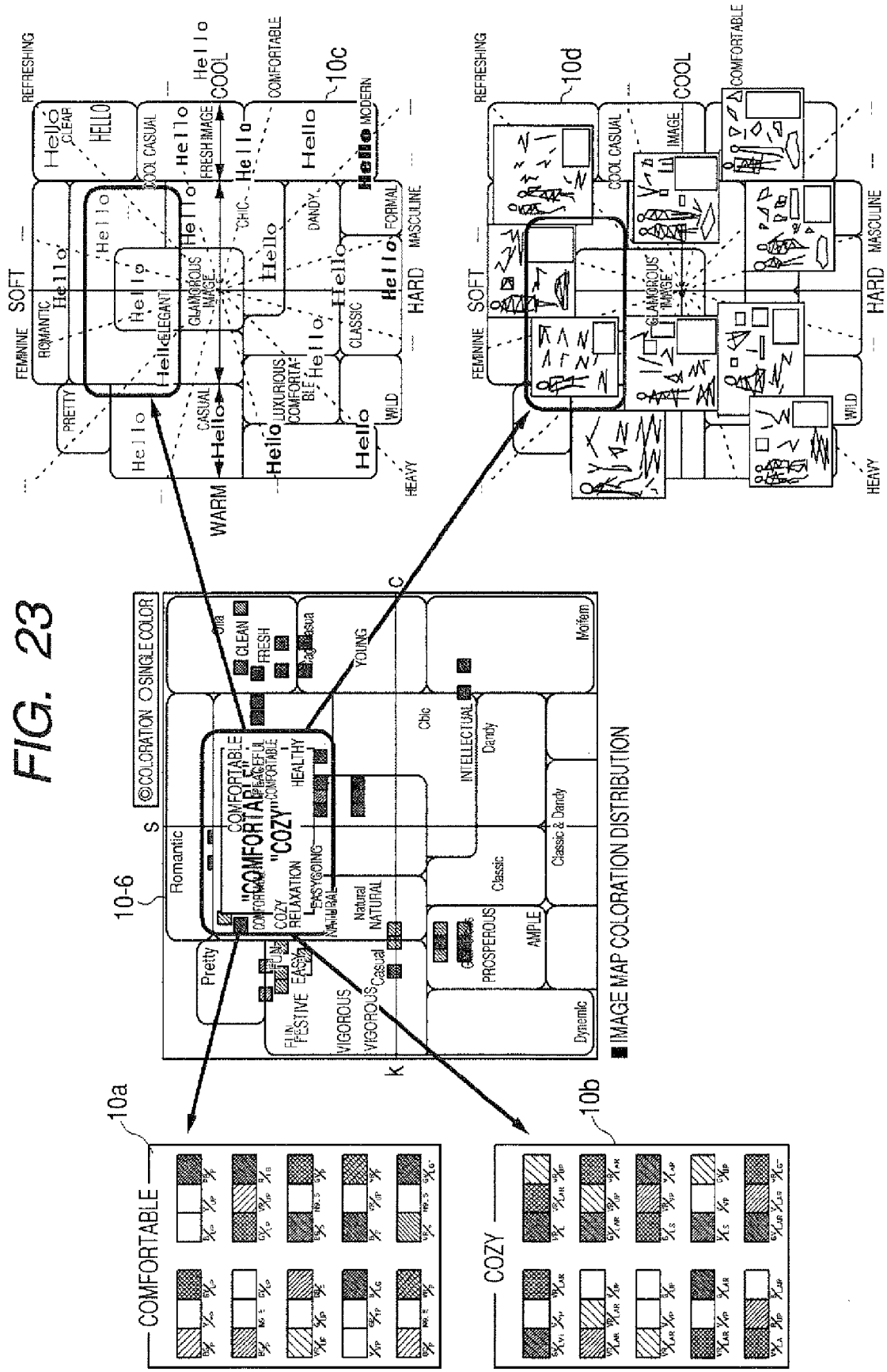
FIG. 23 is a diagram illustrating the concept of design production according to the exemplary embodiment of the invention.

FIG. 23 shows a specific example of the MIGF processing.

For example, as shown on the image map screen 10-6, when representation of design image of the commodity information provision medium (for example, direct mail: DM) conceived by the user (consumer) or representation of design image of the commodity information provision medium intended by the commodity provider is 'comfortable' or 'relaxation', a region (natural or elegant) corresponding to 'comfortable' or 'relaxation' of the image map screen 10-6 is specified by the MIGF processing and displayed on the screen.

In the above-described image map, coloration, font, motive, or the like that specifies image information of each region is associated with the region. Accordingly, with known association information (for example, association information by Japan Color Design Research Institute, Inc.), it is possible to produce a commodity information provision medium in which the representation of the design image is embodied.

That is, a colorant palette indicated by reference numeral 10a in FIG. 23 is associated with information 'natural' representing image set in the specified region in advance. Similarly, a colorant palette indicated by reference numeral 10b in FIG. 23 is associated with information 'elegant' in advance. Further, a font indicated by reference numeral 10c in FIG. 23 or a motive indicated by reference numeral is set in advance in association with the individual regions of the image map screen 10-6.

Therefore, in order to implement the design image representation 'comfortable' or 'relaxation' in a commodity information provision, the commodity information provision may be produced using the colorant indicated by reference numeral 10a or 10b of FIG. 23, the font indicated by reference numeral 10c of FIG. 23, and the motive indicated by reference numeral 10d of FIG. 23.

<Description of MPGF Processing>

A medium process evaluation processing (MPGF processing) that is executed by the client computer 2 having the above-described configuration will be described with reference to FIGS. 24 to 30.

The client computers 2 are respectively connected to the management server 1 through the network 3 and perform communications. Any client computer 2 can function as a terminal of the operator (a process evaluator, such as a product provider).

Moreover, in the following description, it is assumed that the operator uses the management serve 1 to perform processing.

Further, a main menu on which the operator is allowed to select and start the MPGF processing is displayed on the output section 14 of the management server 14. The operator selects and instructs through the input section 13, and then the MPGF processing is executed.

Figure 24:
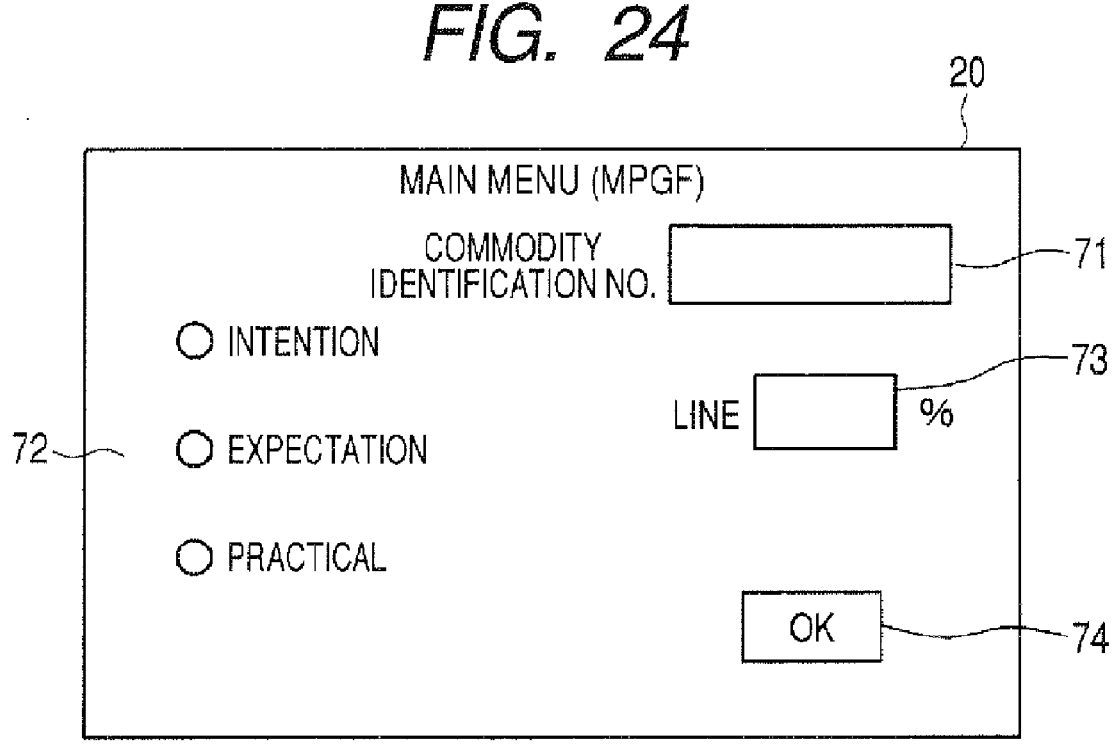
FIG. 24 is a diagram showing a main menu screen of an MPGF processing according to the exemplary embodiment of the invention.

If an MPGF processing program starts, as shown in FIG. 24, the control section 11 causes the output section 14 to display a main menu screen 20 of the MPGF processing and prompts the operator to select a desired processing. Here, on the main menu screen 20, a mouse pointer is displayed, and, if a screen position indicating a desired processing is clicked, the processing starts to be executed.

On the main menu screen 20, a box 70 for inputting an identification number of a commodity to be evaluated is provided. In the following processing, a target database is identified by the number input in the box 70.

Further, on the main menu screen 20, check boxes 72 are provided. The check boxes 72 include an 'intention' check box for selecting a processing of intention information associated with kinds of commodity information provision media that the commodity provider intends to use each step of the purchase process, an 'expectation' check box for selecting a processing of expectation information associated with kinds of commodity information provision media that a commodity consumer expects to use at each step of the purchase process, and a 'practical' check box for selecting a processing of practical information associated with a kind of a commodity information provision medium that the commodity consumer actually uses at each step of the purchase process.

Further, the control section 11 of this exemplary embodiment has a function of displaying lines—for the selected intention information, expectation information and/or practical information—which connects the kinds of commodity information provision media between the steps of the purchase process on an AP×RP matrix described below. Meanwhile, provided is a box 73, in which the operator specifies and inputs the rate (%) of a medium investment amount or a medium utilization degree used in drawing the lines.

Moreover, the box 73 may be blank, that is, not specified, and the processing for generating and displaying by the control section 11 may be omitted.

Accordingly, when the operator inputs a commodity identification number in the box 71 using the input section 13 and then selects an OK button 74, the MPGF processing by the control section 11 is executed. In the selection operation, if the 'intention' check box is checked by the operator, the AP×RP matrix is generated using the intension information stored in the intension information database (storage section 12). If the 'expectation' check box is checked by the operator, the AP×RP matrix is generated using the expectation information stored in the expectation information database (storage section 12). Further, the 'practical' check box is checked by the operator, the AP×RP matrix is generated using the practical information stored in the practical information database (storage section 12).

When plural information is selected, the control section 11 causes the output section 14 to display the generated AP×RP matrices on the same screen in an overlap manner, and visualizes a gap between the commodity information provision methods based on the respective selected information.

Figure 25:
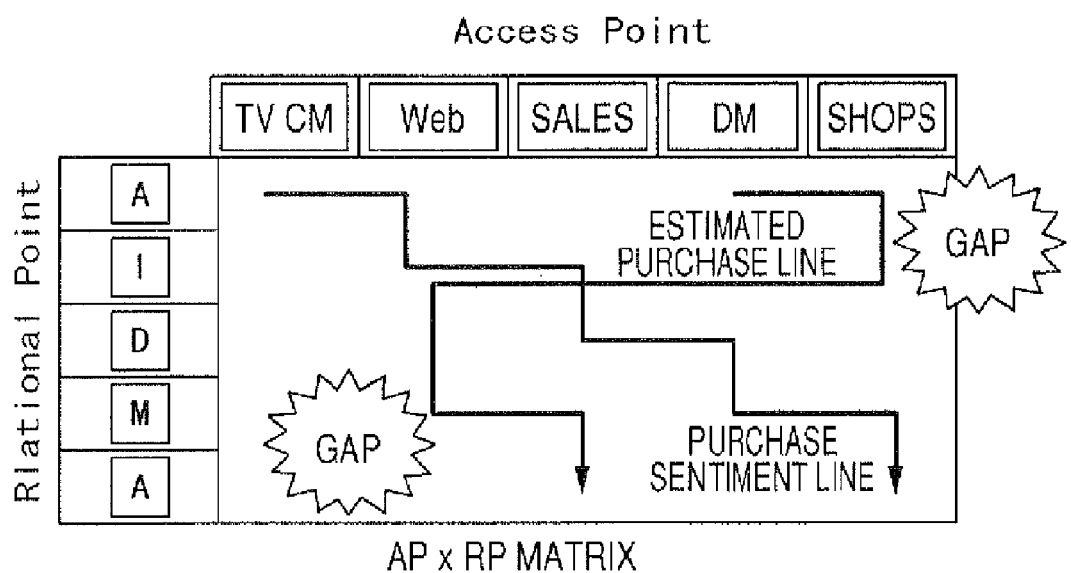
FIG. 25 is a diagram illustrating an AP×RP matrix according to the exemplary embodiment of the invention.

FIG. 25 shows the outline of the AP×RP matrix.

The AP×RP matrix shown in FIG. 25 is matrix information, in which respective media (Access Point: AP) used to provide commodity information are arranged along the horizontal axis and respective step of the purchase process (Relational Point: RP) are arranged along the vertical axis. At each intersections of the AP×RP matrix, shown in the investment amount of a commodity information provision medium intended by the commodity provider, a degree to which extent the consumer expects to use the commodity information provision medium, or a degree to which extent the consumer actually used the commodity information provision medium.

Moreover, the AP×RP matrix may be a matrix that has the commodity information provision medium (AP) as the horizontal axis and each step (RP) of the purchase process as the vertical axis, unlike the relationship between the matrix and the axes shown in FIG. 25.

Further, in this exemplary embodiment, for each of the AP×RP matrix using intention information, the AP×RP matrix using expectation information, and the AP×RP matrix using practical information, the above-described lines are generated and displayed. A mark 'GAP' that indicates a gap between the lines is also displayed in a portion where the gap between the lines is large.

In FIG. 25, the AP×RP matrix that includes the line (estimated purchase line), and uses intention information and the AP×RP matrix that includes the line (purchase sentiment line) and uses expectation information are displayed in an overlap manner. The mark 'GAP' is displayed in a portion where the gap between the lines is equal to or larger than a predetermined value that is set in the control section 11 in advance.

The steps of the purchase process and the kinds of the commodity information provision media forming the AP×RP matrix are common to the AP×RP matrix of the intention information, the AP×RP matrix of the expectation information, and the AP×RP matrix of the practical information. A difference among the AP×RP matrices is in that which one of information relating to the intention of the commodity provider, information relating to the expectation of the consumer (user) and information relating to the practical use of the consumer is used.

Figure 26:
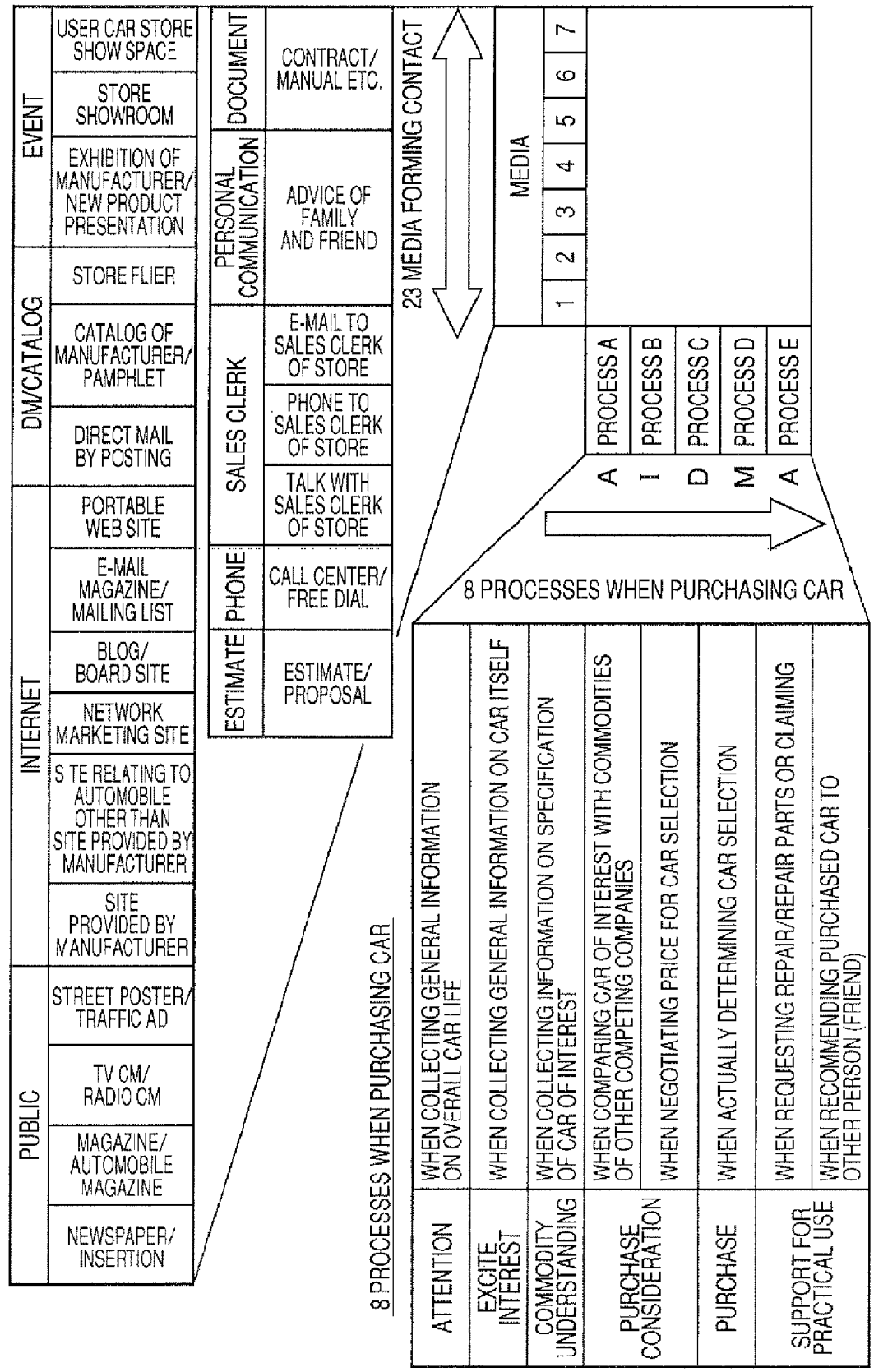
FIG. 26 is a diagram illustrating a purchase process and commodity information provision media according to the exemplary embodiment of the invention.

FIG. 26 shows the steps of the purchase process and the kinds of the commodity information provision medium forming the AP×RP matrix in detail. Here, the AP×RP matrix relates to a commodity 'automobile'.

The kinds of the commodity information provision media include information communication media by public means, information communication media by the Internet, information communication media by DM or catalogs, information communication media by events, information communication media by estimation, information communication media by phone, information communication media by sales clerks, information communication media by personal communication, and information communication media by documents.

In addition, the information communication media by public means include, for example, newspapers or insertions, magazines, TV CM, and street posters. The information communication media by Internet include, for example, sites to be provided by a company, sites to be provided by other companies, network sales sites, board sites, e-mails, and Web sites of cellular phones. The information communication media by DM or catalogs include, for example, posting direct mails, catalogs, and store fliers. The information communication media by events include, for example, exhibitions, showrooms, and store show spaces. The information communication media by estimation include, for example, estimates to be presented to the users or proposals. The information communication media by phone include, for example, the institution of installment of call centers. The information communication media by sales clerks include, for example, talks with sales clerks, calling with sales clerk, and forwarding of e-mails by sales clerk. The information communication media by personal communication include, for example, advices of family. The information communication media by documents include, for example, contracts to be presented to the users.

Meanwhile, the steps of the purchase process forming the AP×RP matrix include, for example, attention, excite interest, commodity understanding, purchase consideration, purchase, and support for practical use.

The step 'attention' corresponds to a time when the consumer collects general information about commodities to purchase. The step 'excite interest' corresponds to a time when the consumer collects general information about a commodity itself. The step 'commodity understanding' corresponds to a time when the consumer collects detailed information, such as the specification of the commodity of interest.

The step 'purchase consideration' corresponds to a time when the consumer compares the commodity of interest with commodities of other competing companies or negotiates the price of the commodity. The step 'purchase' corresponds to a time when the consumer determines the selection of the commodity to purchase. The step 'support for practical use' corresponds to a time when the consumer requests the repair of the purchased commodity.

Moreover, the step 'support for practical use' is a process step after the purchase, but, in this exemplary embodiment, the step 'support for practical use' is included in the purchase process in a sense of a strategy for the next commodity purchase.

Further, in the above example, the individual steps of the purchase process are set to follow the time to the purchase. However, the order is not particularly limited insofar as it is uniform among the intention, expectation, and practical AP×RP matrices.

Before the control section 11 starts the MPGF processing, investment amount information, regarding the commodity, that is associated with information of the purchase process steps and information of the kinds of the commodity information provision media in the above-described matrix format, which are acquired from the commodity provider, is stored in the intention information database of the storage section 12. Further, before the control section 11 starts the MPGF processing, utilization possibility information, regarding the commodity, that is associated with the information of the purchase process steps and the information of the kinds of the commodity information provision media in the above-described matrix format, which are acquired from the commodity consumer, is stored in the expectation information database of the storage section 12. In addition, before the control section 11 starts the MPGF processing, actual utilization information, regarding the commodity, that is associated with information of the purchase process steps and information of the kinds of the commodity information provision media in the above-described matrix format, which are acquired from the commodity provider, is stored in the practical information database of the storage section 12. According to the selection instruction made on the menu 20, the control section 11 extracts information relating to the same commodity from the corresponding database and performs the MPGF processing that generates and displays the AP×RP matrix.

Here, the management serve 1 may acquire the AP×RP matrix information stored in the intention information database, the expectation information database and the practical information database by such a method that the control section 11 acquires the AP×RP matrix information from the commodity provider or the consumer via the network 3, that the input section 13 reads questionnaire sheets collected from the commodity provider or the consumer and analyzes, or the like.

That is, the management server 1 specifies a commodity, acquires from the commodity provider information as to how much he/she intends to invest in which medium at each step of the purchase process, acquires from the consumer information as to what medium he/she expects to use at each step of the purchase process, acquires from the consumer information as to what medium he/she actually used at each step of the purchase process, and correspondingly stores these information in the databases.

Moreover, in the exemplary embodiment, in addition to a gap among three parts of intention, expectation, and practical use, a gap between two parts, that is, a gap between intention and expectation, a gap between intention and practical use, or a gap between expectation and practical use may be visualized and displayed. When only the gap between the two parts is processed, the databases may store two kinds of corresponding information.

FIG. 27 shows a specific example of the AP×RP matrix that is generated by the control section 11 and displayed on the screen of the output section 14.

The AP×RP matrix shown in FIG. 27 relates to the commodity 'automobile'. In the AP×RP matrix, the steps of the purchase process are arranged along the horizontal axis, and the kinds of the commodity information provision media are arranged along the vertical axis. At each of the intersections (matrix elements) of the purchase process steps and the kinds of the commodity information provision medium, a numeric value that represents a degree regarding the medium is displayed. In the AP×RP matrix of the intention information, the numeric value represents a degree to which extent the commodity provides invests to the corresponding commodity information provision medium. In the AP×RP matrix of the expectation information, the numeric value represents a probability that the consumer will use the corresponding commodity information provision medium. In the AP×RP matrix of the practical information, the numeric value represents a degree to which extent the consumer actually used the corresponding commodity information provision medium.

Further, in the example of FIG. 27, the control section 11 causes the output section 14 to perform display 76, 77, and 78 as an index of the degree and to display matrix elements having corresponding degrees in a similar manner to the respective index displays (color coding, highlight, halftone, and visually identifiable one).

That is, a matrix element having a degree represented by a numeric value of 40% or more is displayed in the same manner as the index display 76. Similarly, a matrix element having a degree represented by a numeric value of 20% to 40% is displayed in the same manner as the index display 77. Similarly, a matrix element having a degree represented by a numeric value of 20% or less is displayed in the same manner as the index display 78. Accordingly, when the AP×RP matrices of the intention information, the expectation information and the practical information are displayed on the screen in an overlap manner, a gap among "investment," "expectation," and "practical use" at the same degree is visually clarified.

In the example of FIG. 27, the control section 11 displays a line 79 connecting matrix elements that have the highest degree at the respective steps of the purchase process on the AP×RP matrix, and displays the kinds of the commodity information provision media that have a high degree of intention or high degree of expectation at the respective steps of the purchase process in a format of the line. Moreover, the control section 11 may set a criterion of displaying of the line, and may generate and display a line having a different degree, such as a medium degree or a low degree. The line connecting the elements having a high degree is useful in comparing the degree of intention or expectation.

Figure 28:
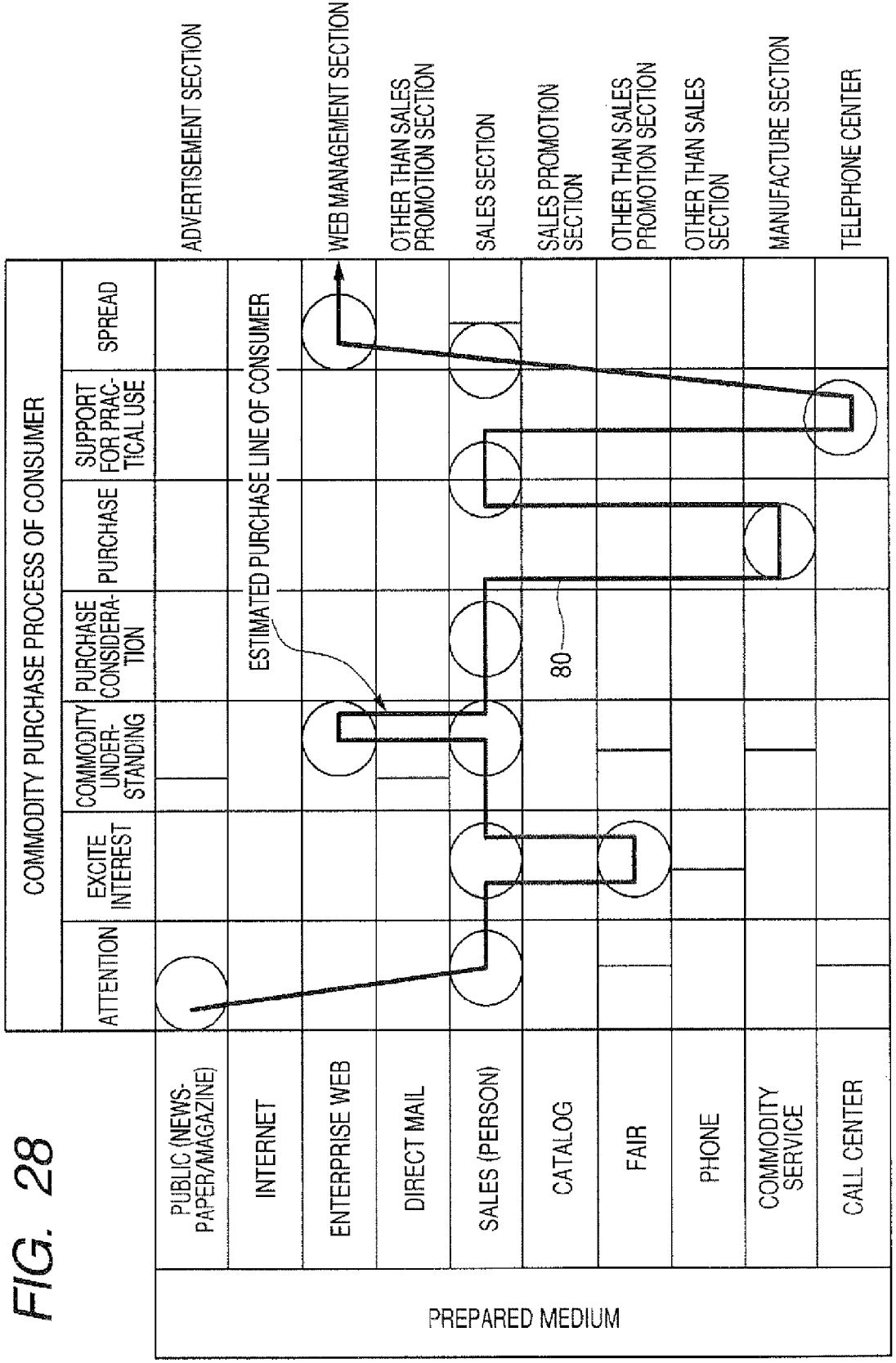
FIG. 28 is a diagram showing an AP×RP matrix screen of intention information according to the exemplary embodiment of the invention.
Figure 29:
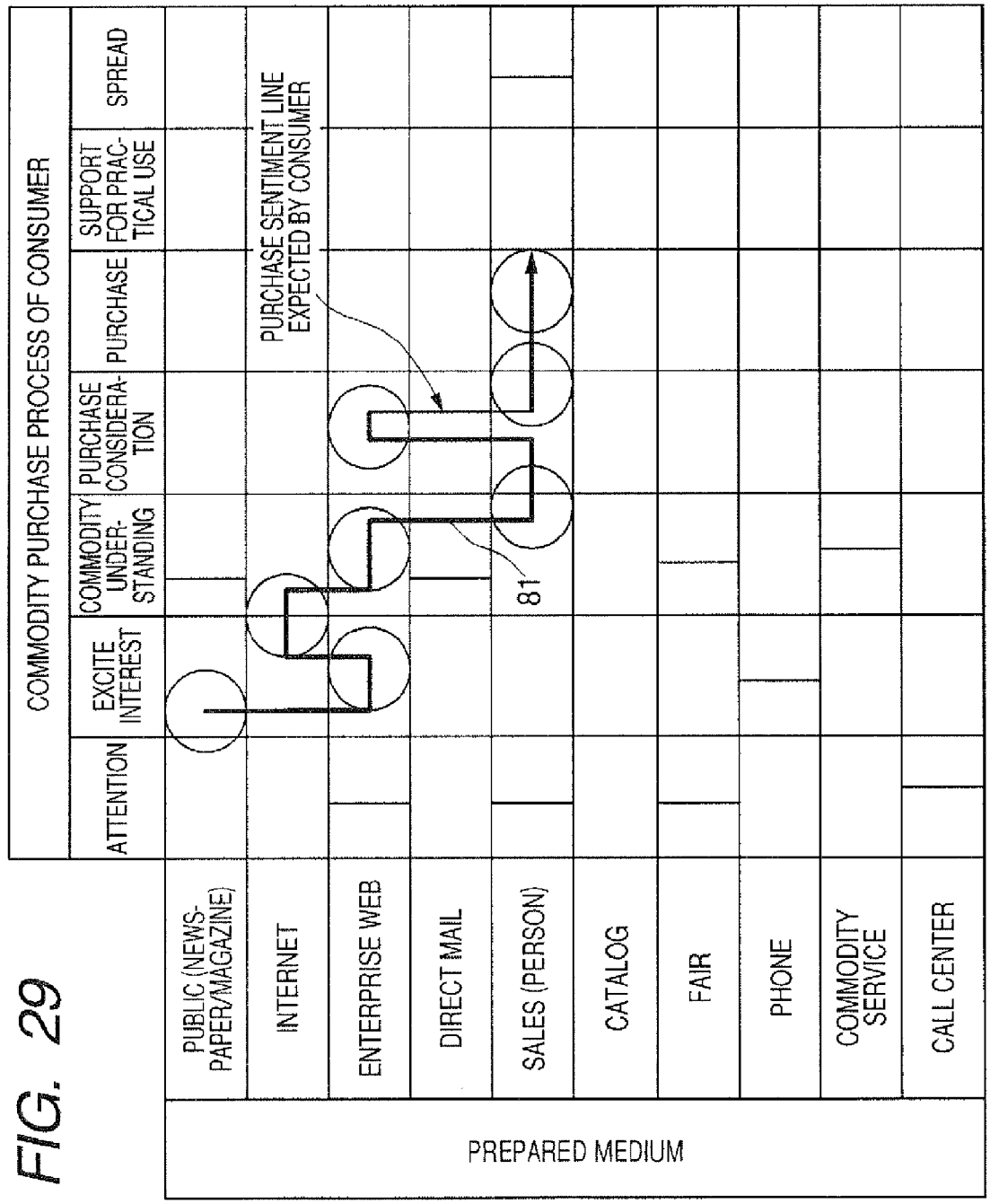
FIG. 29 is a diagram showing an AP×RP matrix screen of expectation information according to the exemplary embodiment of the invention.
Figure 30:
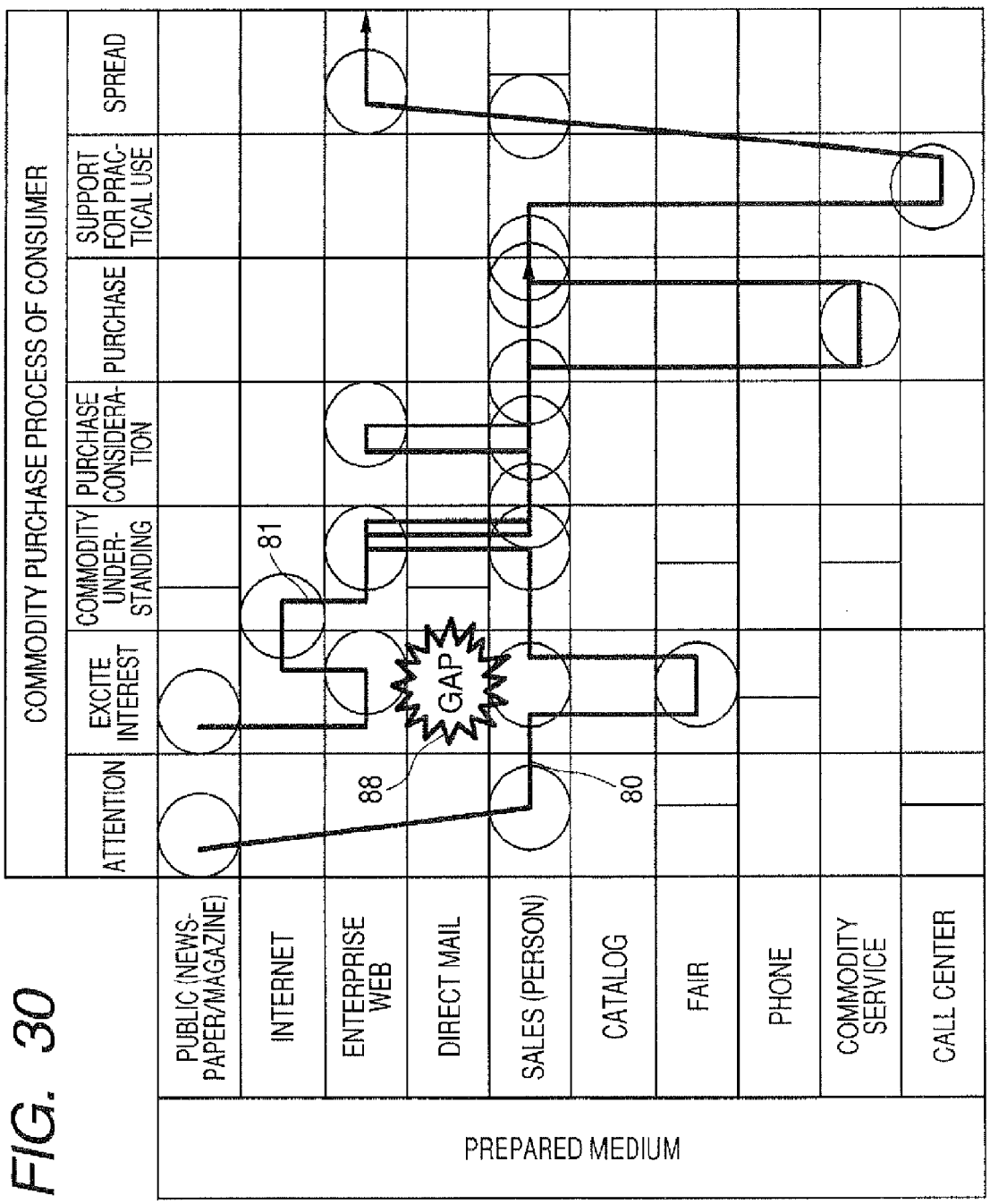
FIG. 30 is a diagram showing an AP×RP matrix screen, on which intention information and expectation information according to the exemplary embodiment of the invention.

FIGS. 28 and 30 show screen display examples of that AP×RP matrix for a commodity 'OA instrument'. FIG. 27 shows an AP×RP matrix of the intention information. FIG. 28 shows an AP×RP matrix of the expectation information. FIG. 29 shows an AP×RP matrix in which the intention information and the expectation information are displayed in an overlap manner.

In the purchase process of the horizontal axis of the AP×RP matrix, the steps of attention, excite interest, commodity understanding, purchase consideration, purchase, support for practical use, and spread are arranged. As the commodity information provision media of the vertical axis of the AP×RP matrix, public, Internet, enterprise Web, direct mail, sales, catalog, fair, phone, commodity service, and call center are arranged.

In the example of FIGS. 28 to 30, the control section 11 does not display the numeric values representing the degrees in the matrix elements, that is, renders the matrix elements to be blank, and displays a line connecting elements having the highest degrees at the respective steps.

In the AP×RP matrix of the intention information in FIG. 29, a commodity information provision method that an enterprise (commodity provider), which sells the OA instrument, intends that the consumers desire is displayed as an estimated purchase line 80. In the AP×RP matrix of the expectation information in FIG. 28, a commodity information provision method that the consumer who wants to purchase the OA instrument expects to use before the purchase is displayed as a purchase sentiment line 81.

Then, according to an overlap display instruction by the operator through the input section 13, the control section 11 displays the AP×RP matrices of the intention information and the expectation information on the same screen in an overlap manner. Thereby, as shown in FIG. 30, the estimated purchase line 80 and the purchase sentiment line 81 are displayed on the AP×RP matrix. In addition, a 'GAP' mark 83 is displayed in a portion where a gap between the estimated purchase line 80 and the purchase sentiment line 81 is equal to or larger than a predetermined degree.

For example, a reference value representing a degree of gap input by the operator through the input section 13 is set in the control section 11. Then, a degree of separation (for example, a coordinate value distance) between the lines on the AP×RP matrix is compared with the reference value. Thereafter, a mark (for example, a 'GAP' mark 83) that clearly expresses the gap is displayed at a position between the lines on the AP×RP matrix where the gap is equal to or larger than the reference value.

Moreover, so long as the mark that clearly expresses a large gap between the lines, other marks may be used. Further, the color of a region between the information may be changed or highlighted. In summary, any method may be used insofar as the separation portion (gap portion) can be identified on the screen.

Therefore, the gap between the commodity information provision method that the commodity provider intends to use and the commodity information provision method that the consumers expect to use can be visualized and evaluated at a glance.

Moreover, the same is applied to the AP×RP matrix of the practical information. That is, if an arbitrary combination including a line of practical information is selected, the same image display is made by the control section 11.

The expectation information or the practical information relating to the commodity information provision method is acquired from the individual users in the questionnaire format, and the expectation information or the practical information and the intention information for each individual user may be displayed on the same screen in an overlap manner. Accordingly, a gap between the expectation or practical use of the individual user with respect to a given commodity and the intention of the commodity provider can be easily evaluated. Then, if plural users (expectation information or practical information) are identifiably displayed on the screens broad and objective evaluation can be performed.

Moreover, as described below, a consumer model is generated by clustering plural users on the basis of attribute information, and the expectation information or practical information for each consumer model and the intention information of the commodity provided are displayed on the same screen in an overlap manner. Thereby, a gap between the commodity information provision methods of the consumer model and the commodity provider can be easily evaluated.

<Description of Consumer Model Processing>

The processing 100 relating to the consumer model that is executed by the client computer 2 having the above-described configuration will be described with reference to FIGS. 31 to 35.

This processing executes a processing of clustering plural consumers on the basis of the factors (personality, action characteristic, and attitude to a commodity (value)) and executes a processing of using the generated user cluster (consumer model) as a user who is a subject of the expectation information or the practical information in the MIGF processing or the MPGF processing.

The client computers 2 are respectively connected to the management server 1 through the network 3 and perform communications. Any client computer 2 may function as an operator's terminal device r.

Moreover, in the following description, for convenience, it is assumed that the operator operates the management server 1 to perform processing.

Further, as described below, the management serve 1 automatically stores information of each user in the user information data base of the storage section 12. The management server 1 may automatically execute the processing of clustering the users in response to the acquiring of the user information. In addition, the management server 1 may start the processing according to the instruction of the operator.

Moreover, in the following description, for convenience, it is assumed that the management server 1 performs the user clustering processing according to the instruction of the operator.

First, as described in the MIGF processing or the MPGF processing, the information relating to the image of the commodity information provision medium acquired from the user, the information relating to the expectation of the commodity information provision medium acquired from the user, the information relating to the actual utilization of the commodity information provision medium acquired from the user are stored in the storage section 12 as the user image information database, the expectation information database, and the practical information database, respectively.

In this exemplary embodiment, when these database information is acquired, the user provides his/her factor information and attribute information to the management server 1 by replying the questionnaire. The management server 1 stores the factor information of the user and attribute information of the user in the user information database of the storage section 12 in association with the user image information, the expectation information, and the practical information acquired from the user (that is, the reply to the questionnaire about the process or the image).

Figure 33:
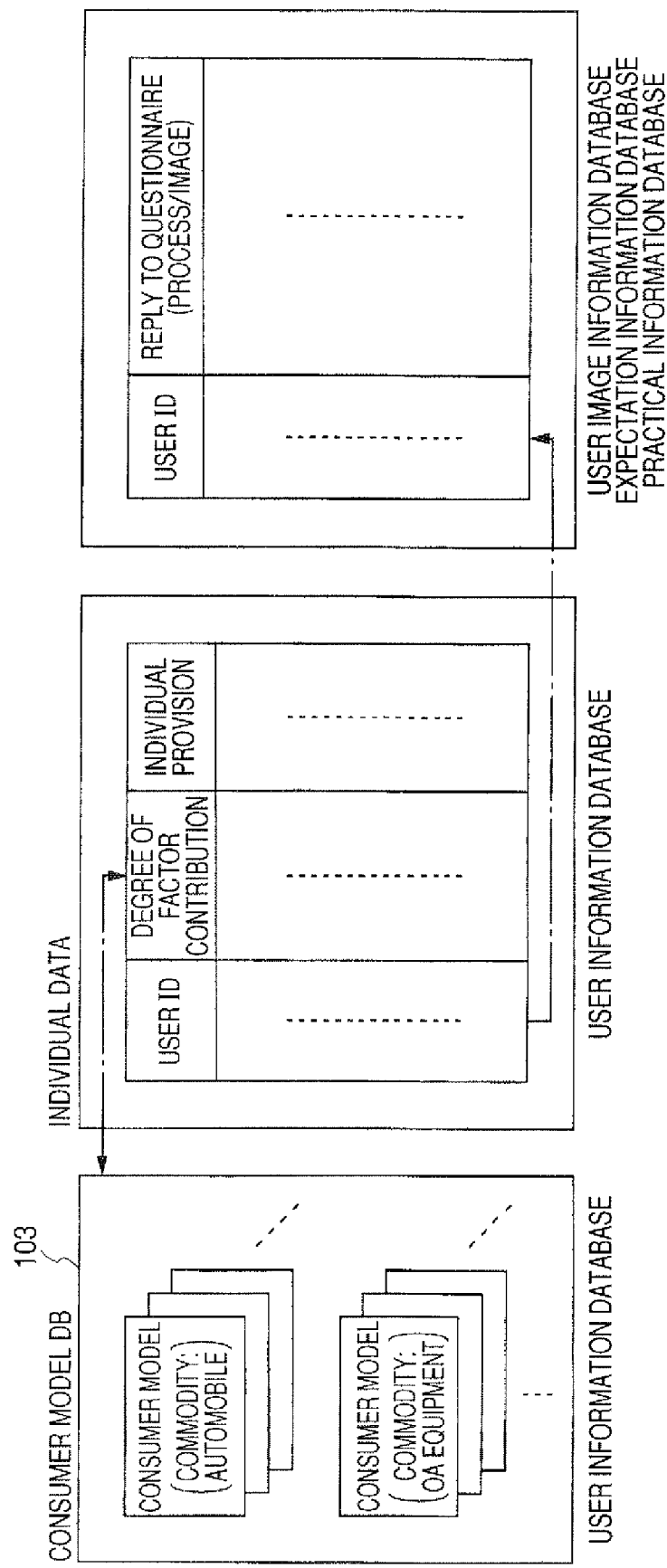
FIG. 33 is a diagram illustrating the relationship among a consumer model, a degree of factor contribution, and a reply to a questionnaire according to the exemplary embodiment of the invention.

That is, as shown in FIG. 33, the management server 1 identifies the individual users, from whom the user image information, the expectation information, and the practical information (the reply to the questionnaire) are acquired, by user IDs, and stores the information in the user image information database, the expectation information database, and the practical information database. Further, the management sever 1 identifies the users by the user IDs and stores the degree of factor contribution and individual attribute information (age, sex, and family) in the user information database.

Moreover, the degree of factor contribution is factor information representing personality of the user or the like. In this exemplary embodiment, as described below, the degree of factor contribution is represented by a rate (%) for each factor.

Here, FIG. 32A shows an example of the outline of a consumer model with an automobile used as a commodity.

The consumer model 103 is a model obtained by clustering plural users on the basis of the factors. A predetermined set of models that have different degrees of factor contribution is prepared for each commodity in advance. In this exemplary embodiment, the consumer model is stored in the user information database in advance.

FIG. 32A shows a consumer model set with an automobile used as the commodity. The individual models in the set are identified by cluster numbers. A characteristic (car enthusiast and the like) collectively representing the degree of factor contribution is given to each model.

In each consumer model, a factor and the degree of factor contribution (%) are defined. For example, subjectivity (degree of contribution: 70 to 90%) and cooperation (degree of contribution: 20 to 30%) are defined as a factor relating to personality and a degree of the factor contribution. Further, as a factor relating to action characteristic and a degree of the factor contribution, importance of information acquisition (30 to 40%) and importance of information communication (70 to 80%) are defined. In addition, as a factor relating to attitude to the commodity and a degree of the factor contribution, importance of functional values (80 to 90%) and importance of emotional values (10 to 20%) are defined. The factors and the degrees of the factor contribution define characteristics of the modeled consumers.

Meanwhile, the factor information acquired from the individual users as the replies to the questionnaire has, for example, the contents shown in FIG. 32B in correspondence with the factors defining the consumer model.

For example, when the commodity is an automobile, the user replies the following inquiries about the individual factors as 'Yes' or 'No', such that the factor information is acquired from the individual users: an inquiry about subjectivity (I immediately conduct upon decision) and an inquiry about cooperation (I follow other person friendly) as the factors relating to personality; an inquiry about importance of information acquisition (I want to know information quickly) as the factor relating to action characteristic; and an inquiry about importance of functional values (I tend to speed up) as the factor relating to the attitude to the commodity.

Here, for simple explanation, a simple example is used, but plural inquiry items about subjectivity may be used. For the user who replied 'Yes' on the inquiries at 70 percent, the degree of factor contribution of subjectivity may be set to 70%. The same may apply to other factors.

Therefore, the control section 11 performs a factor analysis processing on the basis of the reply to the questionnaire from the user. As the processing result, as shown in FIG. 33, the degree of factor contribution (the degree of contribution about subjectivity and cooperation relating to personality, the degree of contribution about importance of information acquisition and importance of individual relating to action characteristic, the degree of contribution about importance of functional values or importance of self-expression relating attitude to commodity) is recorded in the user information database for each user (user ID). Moreover, in this exemplary embodiment, individual attribute information, such as age or sex, is acquired and recorded through the questionnaire.

Accordingly, for the users who give the reply to the questionnaire to the server 1 in respect to the image or process and factor information, the reply contents (the reply to the questionnaire) relating to the image or process are recorded in association with the degree of factor contribution. Further, in the clustering processing executed by the control section 11, the users are grouped on the basis of the degree of factor contribution into the respective consumer models prepared for each commodity (automobile or OA instrument).

That is, when a consumer model is specified, the reply contents relating to the image or process acquired from the users in the consumer model can be specified. Therefore, in the MPGF processing or the MIGF processing, a group of consumers who have a common or similar preference or hobby can be analyzed.

Figure 34:
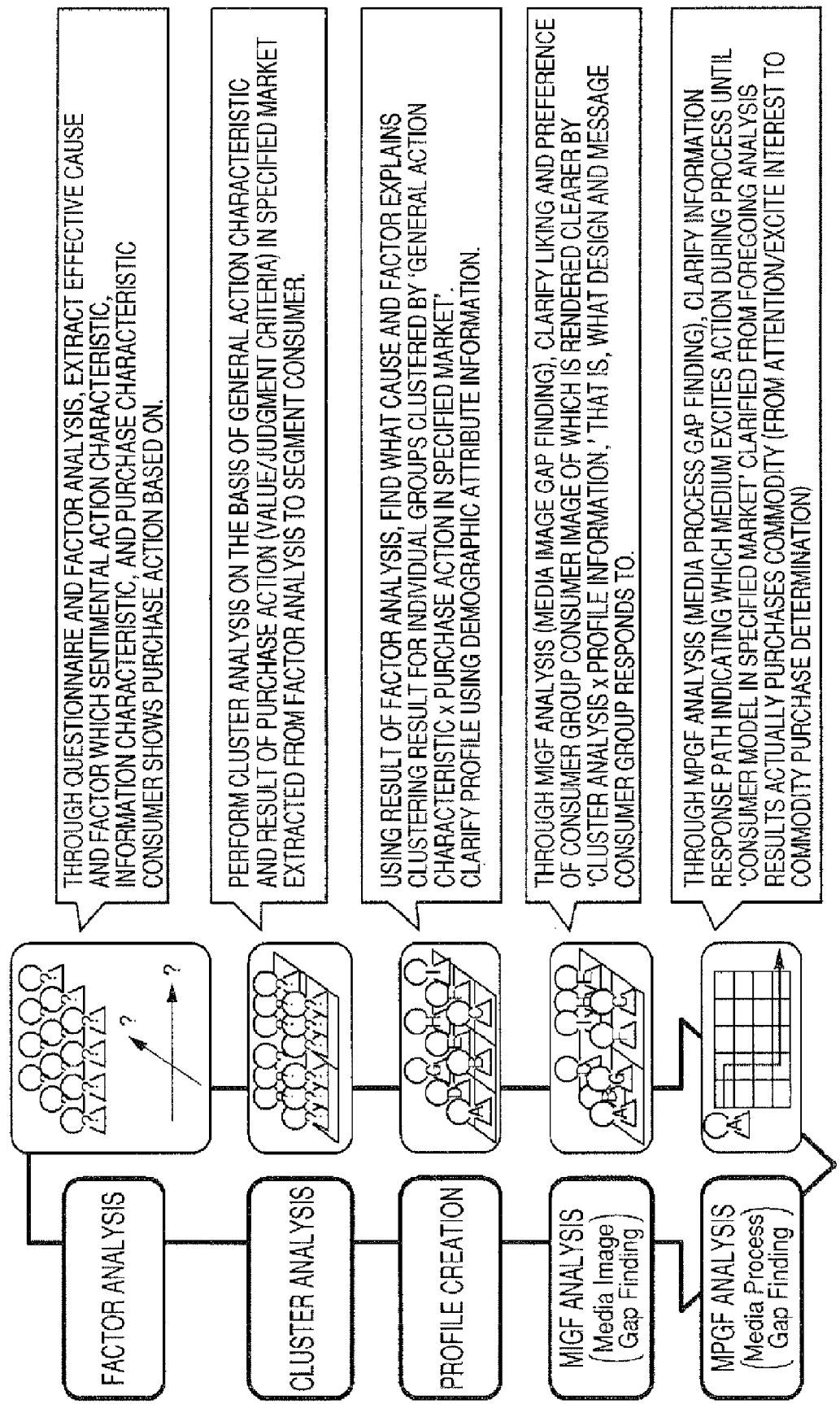
FIG. 34 is a diagram showing a user clustering processing and the relationship between an MIGF processing and an MPGF processing according to the exemplary embodiment of the invention.

FIG. 34 shows the concept where the control section 11 performs the clustering processing and the result is applied to the MIGF processing or the MPGF processing.

Figure 35:
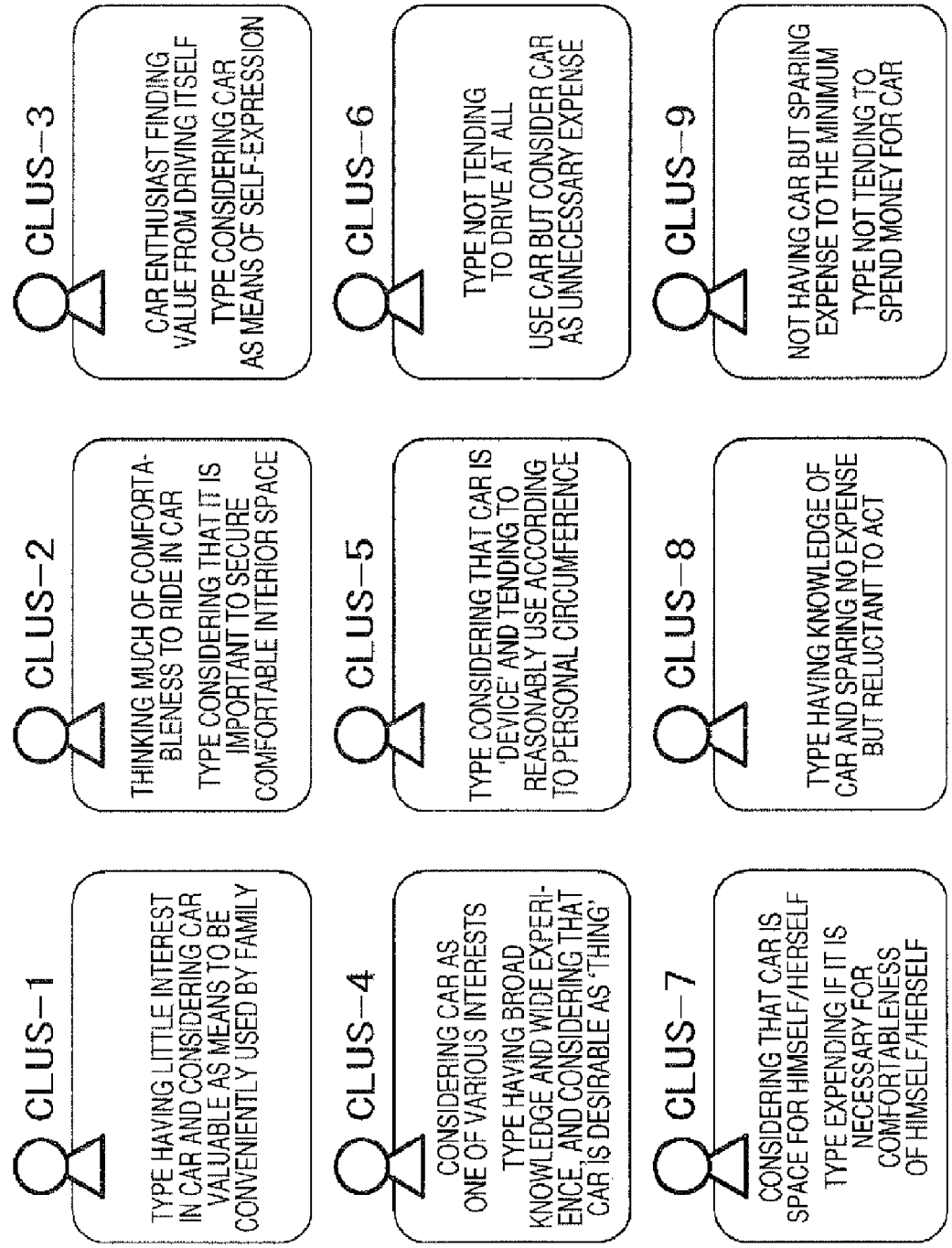
FIG. 35 is a diagram showing an example of a user cluster (consumer model) according to the exemplary embodiment of the invention.

In the clustering processing, the information acquired from the individual users (consumers) is subject to known factor analysis and the clustering processing, and a profile creation processing, to thereby generate the above-described clusters. Then, as shown in FIG. 35, the users are classified into the consumer models (clusters: CLUS-1 to 9) characterized by the factors, such as preference, situation, sentiment, and action. Then, the cluster data is applied to the MIGF processing or the MPGF processing. Thereby, for each consumer model (cluster: CLUS-1 to 9), image of commodity information provision medium, timely expectation of the commodity information provision medium, and timely utilization of the commodity information provision medium are clarified, such that a gap from the intention of the commodity provider is visualized.

Here, when the management server 1 acquires the user image information, the expectation information, and the practical information transmitted from the client computer 2 by the user, for example, a questionnaire input screen that has a column, in which the user inputs his/her own factor information and attribute information together with the image information and the expectation information, may be displayed on the screen of the client computer 2. Then, the information input on the screen may be transmitted to the management server 1.

Further, when the management server 1 reads the questionnaire collected from the user using the input section 13 and acquires the user image information, the expectation information, and the practical information, a field in which the user enters his/her own factor information and attribute information together with the user image information and the expectation information may be provided in the questionnaire.

A main menu on which the operator is allowed to select and start the clustering processing is displayed on the output section 14 of the management server 1, and a processing relating to the clustering of the users is executed in response to an operator's selection operation from the input section 13.

Figure 31:
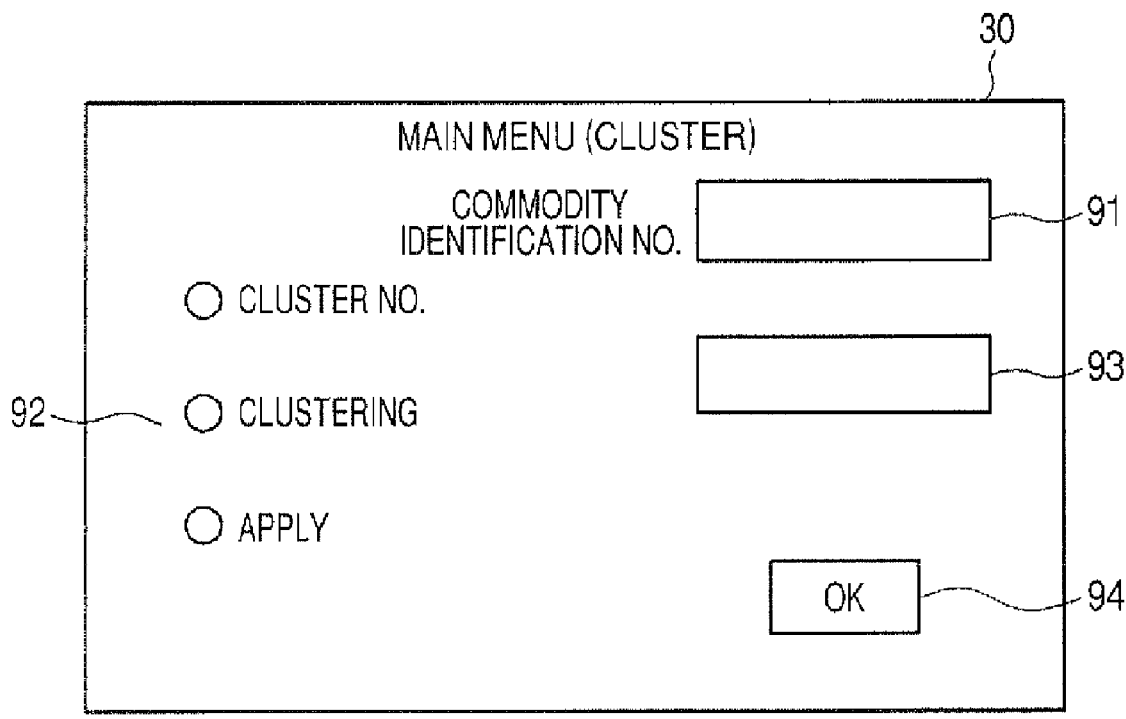
FIG. 31 is a diagram showing a main menu screen of a user clustering processing according to the exemplary embodiment of the invention.
Figure 32:
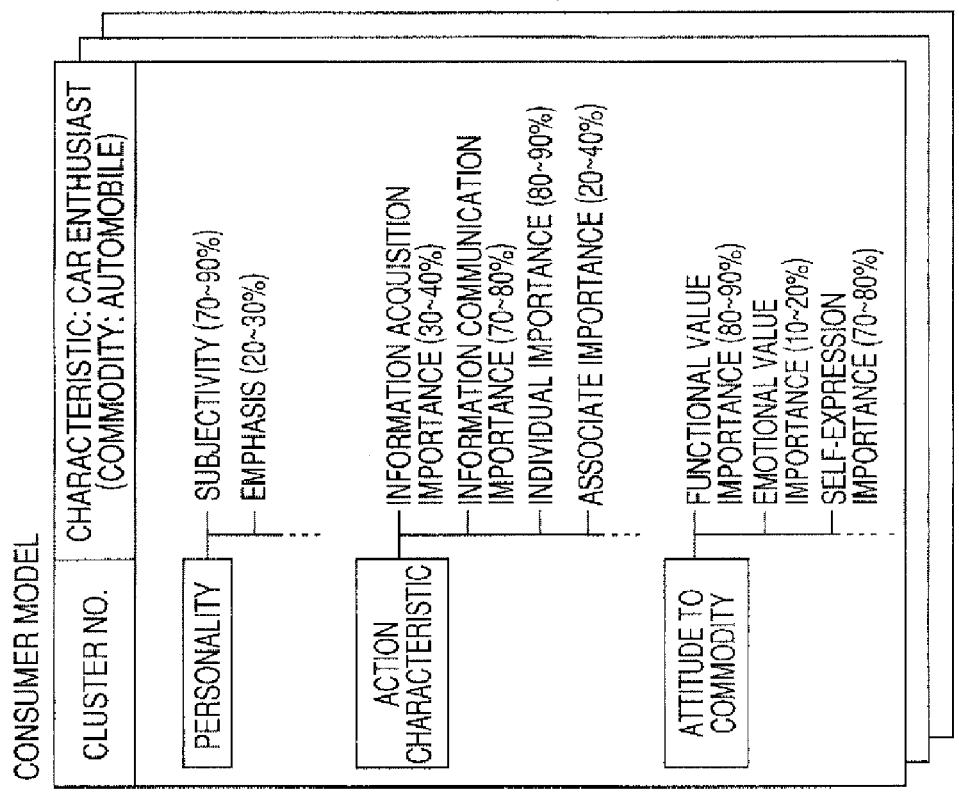
FIGS. 32A and 32B are diagrams illustrating examples of a consumer model and a modeling questionnaire according to the exemplary embodiment of the invention.

If the processing program relating to the clustering of the users starts, the control section 11 causes the output section 14 to display a main menu screen 30 of the user clustering processing and prompts the operator to select a desired processing as shown in FIG. 31. Here, on the main menu screen 30, a mouse pointer is displayed and, if a screen position indicating a desired processing is clicked, execution of the processing starts.

On the main menu screen 30, a box 91 for inputting an identification number of a commodity to be evaluated is provided. In the processing, a target database is identified by the number input in the box 91.

Further, on the main menu screen 30, check boxes 92 are provided. The check boxes include a 'clustering' check box for selecting the processing of clustering the users on the basis of the factor information, and an 'apply' check box for allowing clustered user data as the user of the MIGF processing or the MPGF processing.

That is, in this exemplary embodiment, the MIGF processing or the MPGF processing is basically performed with the users as the subject. However, if the operator checks the 'apply' check box and then selects an 'OK' button 94, clustered user information is applied as the subject of the processing, as described below.

Further, on the main menu screen 30, a box 93 for inputting the number to specify a user cluster is provided.

Therefore, to cluster the user information of the individual users stored in the user information database, the management server 1 starts the processing by checking the 'clustering' check box 92 and selecting the 'OK' button 94.

Moreover, if the clustering processing is performed, the management server 1 informs the operator of the cluster number for identifying each cluster, characteristic information of the cluster (for example, car enthusiast) and the number for identifying a commodity relating to the acquired user information through the output section 14. Then, the operator applies the clustered user data to the MIGF processing or the MPGF processing using the informed information.

If the processing of clustering the individual user information is performed, the management server 1 temporarily holds the user information (the reply to the questionnaire relating to the image or process) clustered by the consumer model. Then, the user information is used in the MPGF processing or the MIGF processing.

Therefore, if the cluster number or the consumer model characteristic is specified, the image information or the expectation information which is acquired from the individual users and contained in the specified cluster can be used in processing.

Moreover, in this exemplary embodiment, the management server 1 performs known factor analysis or the clustering process for the individual user information, performs a processing of arranging the image information or the expectation information of the individual users contained in the cluster as the image information or the expectation information of each cluster, and stores the image information or the expectation information for each cluster in the cluster data as analysis information.

Therefore, the processing of arranging the image information or the expectation information of the individual users as the image information or the expectation information of each cluster may be performed, if necessary. Meanwhile, if the image information or the expectation information of each cluster is prepared in advance, the subsequent processing can be rapidly performed.

Meanwhile, in order to apply the clustered user data to the MIGF processing or the MPGF processing, as described above, when the MIGF processing or the MPGF processing starts, the 'apply' check button 92 is checked, a commodity identification number is input in the box 91, a cluster number to be applied to the box 93, and the 'OK' button 94 is selected. Then, the management server 1 starts the selected processing.

That is, the management server 1 applies the specified cluster (in particular, acquired image or expectation information) relating to the specified commodity and executes the MIGF processing or the MPGF processing. Therefore, the image information or the expectation information of the user cluster (consumer model) characterized by a hobby or preference is applied to the MIGF processing or the MPGF processing. As a result, the image of the commodity information provision medium can be evaluated and created on the basis of the consumers' demands. Further, the commodity information provision medium can be evaluated and improved on the basis of the consumers' demands.

That is, if the operator determines the consumer model and starts the MPGF processing or the MIGF processing, the acquisition information (the reply to the questionnaire) relating to the users' process or the image of the individual users contained in the specified consumer model is specified. Then, the acquisition information is subject to the MPGF processing or the MIGF processing and the processing result is displayed on the screen.

For example, in the MPGF processing, on the basis of plural replies in the consumer model, a line connecting the highest points of reply frequencies is used as the purchase process of the consumer model. Further, on the basis of plural replies in the consumer model, a position where the replies are biased on an image scale may be used as the user image. In this case, screen display may be performed in the same manner as the above-described case.

Figure 36:
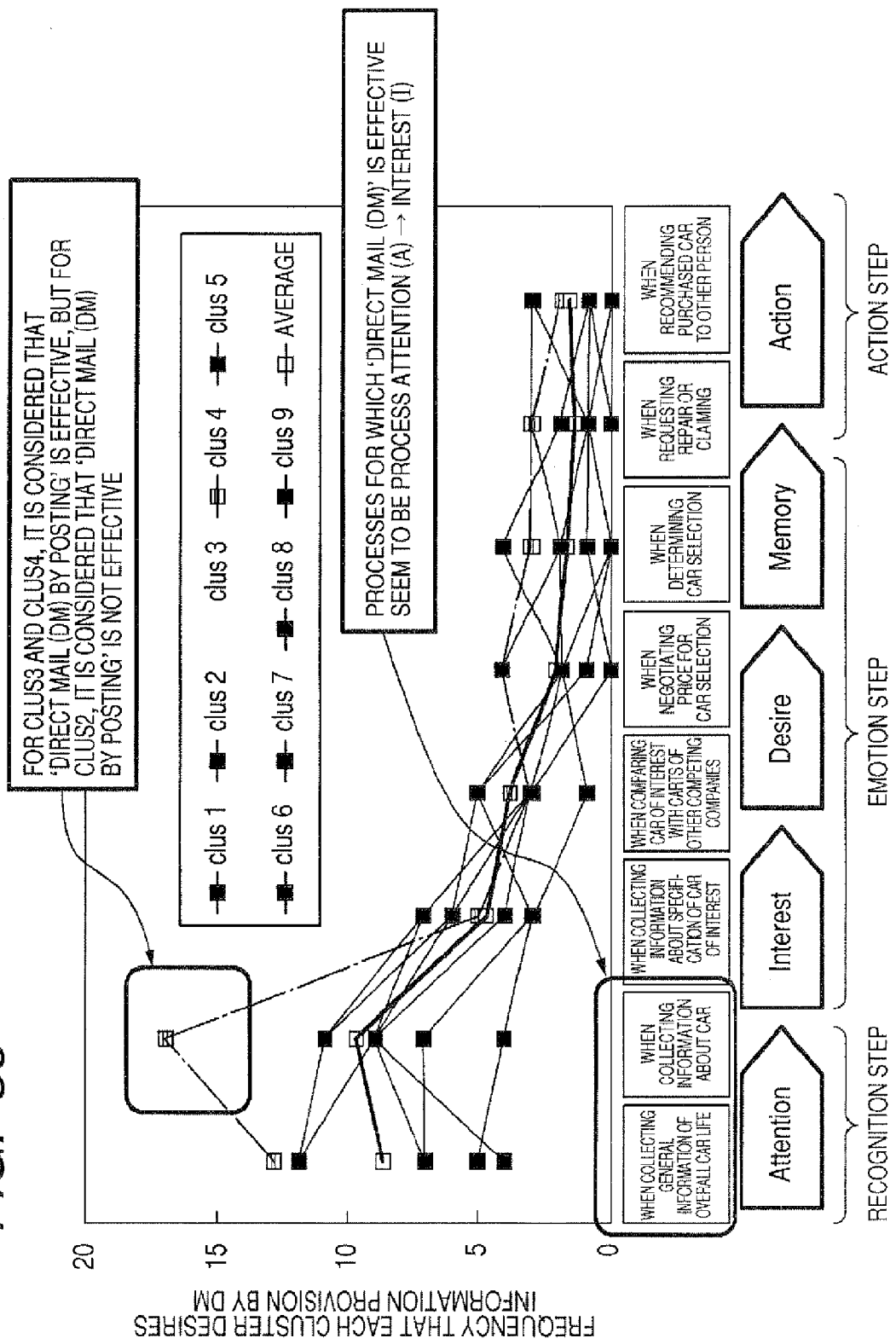
FIG. 36 is a diagram showing another display example of an MPGF processing according to the exemplary embodiment of the invention.

FIG. 36 shows another display example where a consumer model is used in the MPGF processing.

In this example, the control section 11 sets the degree of expectation (for example, such a degree that the consumer desires to receive information by DM) as the vertical axis and each step of the purchase process as the horizontal axis. Then, the result of the MPGF processing is displayed on the output section 14 by a line chart for each consumer model (clus1 to 9). With this display state, it is possible to evaluate at a glance what time each consumer desires commodity information by the direct mail (DM).

<Description of Medium Evaluation Processing>

A medium evaluation processing that is executed by the management server 1 having the above configuration will be described with reference to FIGS. 37A and 37B.

Figures 37A, 37B:
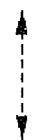
FIGS. 37A and 37B are diagrams illustrating the relation between the AP×RP matrix and access information according to the exemplary embodiment of the invention.

FIG. 37A shows a part of an AP×RP matrix based on the expectation information. In the AP×RP matrix, the vertical axis represents the commodity information provision media such as Public, the Internet, Enterprise Web and Direct Mail, and the horizontal axis represents steps of the purchase process such as Attention and Excite Interest.

The control section 11 displays the expectation information acquired from the consumer and stored in the expectation information database of the storage section 12 on the screen through the output section 14, to thereby visualize the expectation information. At each of the intersections (frames) of the commodity information provision media and the steps of the purchase process of the AP×RP matrix, among the replies to the questionnaire, the percentage of the consumers who give a positive reply that purports to use the commodity information is displayed.

For example, the consumers that expect to receive commodity information by 'Direct Mail' at the step 'Excite Interest' occupy 60% among plural consumers who respond the questionnaire.

Here, in acquiring the expectation information, for the medium evaluation process, the control section 11 acquire access information (user contact information: residence, phone number, and the like) to access a consumer, from the consumer who responds the questionnaire. Then, as shown in FIG. 37B, the control section 11 stores the access information in the expectation information database in association with the user IDs and the replies to the questionnaire of the concumers.

Moreover, in FIG. 33, the access information is omitted.

For the AP×RP matrix displayed on the screen, if any intersection frame (for example, the intersect ion frame between 'Excite Interest' and 'Direct Mail') is specified through the mouse operation of the input unit 13 by the operator, the control section 11 specifies a user ID that gives the expectation information as a tabulation source of the specified intersection frame. For example, if the intersection frame between 'Excite Interest' and 'Direct Mail' is specified, a positive reply that purports to expect the provision of the commodity information by 'Direct Mail' at the step 'Excite Interest' is specified from among the replies to the questionnaire stored in association with the user ID, and the user ID corresponding to the positive reply is specified.

Then, the control section 11 outputs all the access information (user contact information) associated with the specified user ID through the output section 14 by screen display or printing.

Accordingly, if a certain medium is specified at a certain process step in the expectation information (AP×RP matrix), the access information of the consumer who expects to receive the commodity information by the certain medium at the certain process step is specified and output. With the access information, it is possible to provide commodity information to a consumer, who expects to receive the commodity information, by an expected medium at an expected step (time) (for example, the commodity information can be sent by a direct mail).

In addition, in this example, the management server 1 can perform the medium evaluation processing using the consumer model (user cluster).

That is, as shown in FIG. 33, the user information database of the storage section 12 stores data for clustering the individual consumers (user IDs) by the consumer model, and thus the control section 11 specifies another consumer (user ID) who belongs to the same consumer model (user cluster) as the consumer whose access information is specified and output in the above-described manner.

Then, the control section 11 specifies the access information (user contact information) of another consumer (user ID) specified from the information shown in FIG. 37B and outputs the specified access information through the output section 14 by screen display or printing in the same manner.

Accordingly, if a given medium is specified at a given process step in the expectation information (AP×RP matrix), the access information of the consumer who expects to receive the commodity information by the medium at the process step, specifically, the access information of another consumer who belongs to the same consumer model as the consumer is specified and output. With the access information, it is possible to provide commodity information to a consumer, who expects to receive the commodity information, specifically, a consumer who is assumed to expect the commodity information similarly from commonality, such as preference or the like, by an expected medium at an expected step (time).

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The exemplary embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. The method comprising:

acquiring, by at least one hardware processor, expectation information of commodity consumers;

wherein the expectation information indicates respective kinds of commodity information provision media that the consumers expect to use to acquire commodity information provided by a commodity provider, at each of a plurality of steps of commodity purchase process; and wherein the expectation information specifies a certain kind of commodity information provision medium that one of the consumers expects to use at a certain one of the steps of the commodity purchase process;

acquiring, by the at least one hardware processor, access information that is used to access the consumers;

in response to the specified certain kind of commodity information provision medium, specifying, by the at least one hardware processor, access information of the one of the consumers using the access information; and enabling, by the at least one hardware processor, the commodity information to be provided to the one of the consumers by the specified certain kind of commodity information provision medium at the certain one of the steps of the commodity purchase process, using the specified access information of the one of the consumers.

2. A method for evaluating a commodity information provision medium, the method comprising:

acquiring, by at least one hardware processor, expectation information of commodity consumers;

wherein the expectation information indicates respective kinds of commodity information provision media that the consumers expect to use to acquire commodity information provided by a commodity provider, at each of a plurality of steps of a commodity purchase process, and wherein the expectation information specifies a certain kind of commodity information provision medium that one of the consumers expects to use at a certain one of the steps of the commodity purchase process;

acquiring, by the at least one hardware processor, access information that is used to access the consumers;

in response to the specified certain kind of commodity information provision medium, specifying, by the at least one hardware processor, the one of the consumers using the access information;

specifying, by the at least one hardware processor, a cluster to which the one of the consumers belongs, using consumer information regarding a plurality of the consumers;

specifying, by the at least one hardware processor, access information of the one of the consumers and access information of another one of the consumers who belongs to the specified cluster, using the access information; and enabling, by the at least one hardware processor, the commodity information to be provided to the another one of the consumers by the specified certain kind of commodity information provision medium at the certain one of the steps of the commodity purchase process, using the specified access information of the another one of the consumers.

3. A computer readable medium storing a program causing a computer to execute a process for evaluating a commodity information provision medium, the process comprising:

acquiring expectation information of commodity consumers;

wherein the expectation information indicates respective kinds of commodity information provision media that the consumers expect to use to acquire commodity information provided by a commodity provider, at each of a plurality of steps of a commodity purchase process;

wherein the expectation information specifies a certain kind of commodity information provision medium that one of the consumers expects to use at a certain one of the steps of the commodity purchase process;

acquiring access information that is used to access the consumers;

in response to the specified certain kind of commodity information provision medium, specifying access information of the one of the consumers using the access information, to thereby enable the commodity information to be provided to the one of the consumers by the specified certain kind of commodity information provision medium at the certain one of the steps of the commodity purchase process, using the specified access information of the one of the consumers.

4. The computer readable medium according to claim 3, wherein the process further comprises:

displaying, on a screen, the expectation information in a matrix format of kinds of the commodity information provision media and the respective steps of the commodity purchase process; and causing the expectation information to specify the certain kind of commodity information provision medium in response to an operator's operation.

5. A computer readable medium storing a program causing a computer to execute a process for evaluating a commodity information provision medium, the process comprising:

acquiring expectation information of commodity consumers;

wherein the expectation information indicates respective kinds of commodity information provision media that the consumers expect to use to acquire commodity information provided by a commodity provider, at each of a plurality of steps of a commodity purchase process;

wherein the expectation information specifies a certain kind of commodity information provision medium that one of the consumers expects to use at a certain one of the steps of the commodity purchase process;

acquiring access information that is used to access the consumers;

in response to the specified certain kind of commodity information provision medium, specifying the one of the consumers using the access information;

specifying a cluster to which the one of the consumers belongs, using consumer information regarding a plurality of the consumers; and specifying access information of the one of the consumers and access information of another one of the consumers who belongs to the specified cluster, using the access information, to thereby enable the commodity information to be provided to the another one of the consumers by the specified certain kind of commodity information provision medium at the certain one of the steps of the commodity purchase process, using the access information of the another one of the consumers.

6. The computer readable medium according to claim 5, wherein the process further comprises:

displaying, on a screen, the expectation information in a matrix format of kinds of the commodity information provision media and the respective steps of the commodity purchase process; and causing the expectation information to specify the certain kind of commodity information provision medium in response to an operator's operation.

7. An apparatus for evaluating a commodity information provision medium, the apparatus comprising:

a storage unit that stores expectation information of commodity consumers and that stores access information;
wherein the expectation information indicates respective kinds of commodity information provision media that the consumers expect to use to acquire commodity information provided by a commodity provider, at each of a plurality of steps of a commodity purchase process;
wherein the expectation information specifies a certain kind of commodity information provision medium that one of the consumers expects to use at a certain one of the steps of the commodity purchase process; and
wherein the access information is used to access the consumers; and
a control section that, in response to the specified certain kind of commodity information provision medium, specifies access information of the one of the consumers using the access information, to thereby enable the commodity information to be provided to the one of the consumers by the specified certain kind of commodity information provision medium at the certain one of the steps of the commodity purchase process, using the specified access information of the one of the consumers.

8. The apparatus according to claim 7, further comprising:
a display unit that displays, on a screen, the expectation information in a matrix format of kinds of the commodity information provision media and the respective steps of the commodity purchase process; and
specifying unit that causes the expectation information to specify the certain kind of commodity information provision medium in response to an operator's operation.

9. An apparatus for evaluating a commodity information provision medium, the apparatus comprising:

a storage unit that stores expectation information of commodity consumers and that stores access information;
wherein the expectation information indicates respective kinds of commodity information provision media that the consumers expect to use to acquire commodity information provided by a commodity provider, at each of a plurality of steps of a commodity purchase process;
wherein the expectation information specifies a certain kind of commodity information provision medium that one of the consumers expects to use at a certain one of the steps of the commodity purchase process; and
wherein the access information is used to access the consumers; and
a control section that:
in response to the specified certain kind of commodity information provision medium, specifies the one of the consumers using the access information;
specifies a cluster to which the one of the consumers belongs, using consumer information regarding a plurality of the consumers; and
specifies access information of the one of the consumers and access information of another one of the consumers who belongs to the specified cluster, using the access information, to thereby enable the commodity information to be provided to the another one of the consumers by the specified certain kind of commodity information provision medium at the certain one of the steps of the commodity purchase process, using the access information of the another one of the consumers.

10. The apparatus according to claim 9, further comprising:
a display unit that displays, on a screen, the expectation information in a matrix format of kinds of the commodity information provision media and the respective steps of the commodity purchase process; and
a specifying unit that causes the expectation information to specify the certain kind of commodity information provision medium in response to an operator's operation.

* * * * *